United States Patent
Lee et al.

(10) Patent No.: US 10,534,535 B2
(45) Date of Patent: Jan. 14, 2020

(54) WATCH-TYPE TERMINAL AND METHOD FOR CONTROLLING SAME

(71) Applicant: LG ELECTRONICS INC., Seoul (KR)

(72) Inventors: Hyunok Lee, Seoul (KR); Mihyun Park, Seoul (KR); Youngsok Lee, Seoul (KR); Hongjo Shim, Seoul (KR); Youngho Sohn, Seoul (KR); Jisoo Park, Seoul (KR); Hyunwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/773,019

(22) PCT Filed: Jun. 30, 2016

(86) PCT No.: PCT/KR2016/007067
§ 371 (c)(1),
(2) Date: May 2, 2018

(87) PCT Pub. No.: WO2017/082508
PCT Pub. Date: May 18, 2017

(65) Prior Publication Data
US 2018/0321842 A1    Nov. 8, 2018

(30) Foreign Application Priority Data

Nov. 12, 2015    (KR) .......................... 10-2015-0159174

(51) Int. Cl.
*G06F 3/0488* (2013.01)
*G04G 21/08* (2010.01)
(Continued)

(52) U.S. Cl.
CPC ......... *G06F 3/04886* (2013.01); *G04G 9/007* (2013.01); *G04G 21/08* (2013.01);
(Continued)

(58) Field of Classification Search
None
See application file for complete search history.

(56) References Cited

U.S. PATENT DOCUMENTS

2008/0136790 A1* 6/2008 Hio ..................... G06F 3/04817
345/173
2009/0199130 A1* 8/2009 Tsern ..................... G04G 21/08
715/810
(Continued)

FOREIGN PATENT DOCUMENTS

EP            2602704 A1    6/2013
KR    10-2013-0030177 A    3/2013
(Continued)

*Primary Examiner* — Nicholas J Lee
(74) *Attorney, Agent, or Firm* — Birch, Stewart, Kolasch & Birch, LLP

(57) ABSTRACT

The present invention relates to a watch-type terminal enabling touch input sensing and a method for controlling the same. The watch-type terminal comprises: a display unit; a sensing unit for sensing the touch surface area of a touch input applied to the display unit; and a control unit for detecting the direction of changes in the touch surface area of the touch input which has been sensed and, in response to the changes in the touch surface area, for executing a particular function connected to the direction of changes of the touch surface area among a plurality of functions for controlling the operation of a watch-type terminal.

19 Claims, 25 Drawing Sheets

(51) Int. Cl.
*G04G 9/00* (2006.01)
*G06F 3/041* (2006.01)
*H04M 1/725* (2006.01)

(52) U.S. Cl.
CPC ......... *G06F 3/0414* (2013.01); *H04M 1/7253* (2013.01); *H04M 1/72552* (2013.01)

(56) References Cited

U.S. PATENT DOCUMENTS

| | | |
|---|---|---|
| 2014/0115455 A1 | 4/2014 | Kim |
| 2015/0026647 A1 | 1/2015 | Park et al. |
| 2016/0034742 A1* | 2/2016 | Kim .................. H04B 1/385 |
| | | 382/124 |

FOREIGN PATENT DOCUMENTS

| | | |
|---|---|---|
| KR | 10-2013-0030236 A | 3/2013 |
| KR | 10-2013-0042913 A | 4/2013 |
| KR | 10-2015-0011246 A | 1/2015 |
| KR | 10-2015-0045768 A | 4/2015 |
| KR | 10-2015-0096172 A | 8/2015 |
| KR | 10-2015-0105005 A | 9/2015 |

* cited by examiner

WATCH-TYPE TERMINAL AND METHOD FOR CONTROLLING SAME

CROSS REFERENCE TO RELATED APPLICATIONS

This application is the National Phase of PCT/KR2016/007067 filed on Jun. 30, 2016, which claims priority under 35 U.S.C. § 119(a) to patent application Ser. No. 10-2015-0159174 filed in the Republic of Korea on Nov. 12, 2015, all of which are hereby expressly incorporated by reference into the present application.

BACKGROUND OF THE INVENTION

1. Field of the Invention

The present disclosure relates to a watch-type terminal capable of sensing a touch input and a control method thereof.

2. Description of the Related Art

Terminals may be classified into mobile/portable terminals and stationary terminals according to their mobility. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, music file playback through a speaker system, and displaying an image or video on a display unit. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

In order to support and enhance the functions of the terminal, the improvement of structural or software elements of the terminal may be taken into consideration.

In recent years, mobile terminals closely related to users' daily lives have been developed. Therefore, the software of the mobile terminal has been improved in further consideration of the convenience of the user. In addition, as part of the hardware improvement in consideration of the convenience of the user, the mobile terminal has been improved as a wearable device that can be worn on a part of a user's body.

On the other hand, a mobile terminal improved to be worn on a part of a user's body is reduced in size and weight for the wearer's comfort. Accordingly, the mobile terminal is provided with a small display unit, and therefore, the display of the visual information will be restricted.

As a result, the present disclosure proposes a method of allowing a user to conveniently control the operation of a mobile terminal without displaying visual information in a mobile terminal with the limited display of visual information.

SUMMARY OF THE INVENTION

An object of the present disclosure is to control the operation of a mobile terminal according to an area change of a touch input.

Furthermore, another object of the present disclosure is to provide a method of allowing a user to intuitively control the operation of a mobile terminal without displaying visual information.

The present disclosure relates to a watch-type terminal capable of sensing a touch input and a control method thereof, and the watch-type terminal may include a display unit, and a sensing unit configured to sense a touch area of a touch input applied to the display unit, and a controller configured to detect a change direction of the touch area of the sensed touch input, and execute a specific function associated with the change direction of the touch area among a plurality of functions for controlling the operation of the mobile terminal in response to the change of the touch area.

According to an embodiment, an increasing direction of the touch area may be a movement direction of a center point of each of a plurality of touch areas included in the touch input.

According to an embodiment, the controller may execute a function that was executed prior to executing a function currently being executed in the watch-type terminal when the increasing direction of the touch area is a first direction, display a home screen page on the display unit when the increasing direction of the touch area is a second direction, and display a setting menu related to current screen information on the display unit when the increasing direction of the touch area is a third direction.

According to an embodiment, the controller executes the specific function again in response to the touch area having a preset size subsequent to the execution of the specific function and being continuously sensed for a preset period of time.

According to an embodiment, the controller no longer perform the specific function when the touch input is released.

According to an embodiment, when the touch input is sensed while a list including a plurality of items is displayed on the display unit, the controller may select a specific item among the plurality of items according to a change direction of the touch area of the touch input.

According to an embodiment, the controller may display screen information corresponding to a specific item selected at the time of release of the touch input among the plurality of items on the display unit in response to the touch input being released.

According to an embodiment, the controller may control a display level of the screen information in response to a control command corresponding to a change of the touch area while the screen information is displayed on the display unit.

According to an embodiment, the controller may display only at least one item on the display unit based on a preset importance level among the plurality of items in response to a control command corresponding to an increase of the touch area when the touch area being increased is sensed, and display the detailed information of the plurality of items along with the plurality of items when the touch area being reduced is sensed in a state where the plurality of items are displayed on the display unit.

According to an embodiment, the controller may enlarge or reduce the screen information according to a degree of change of the touch area of the touch input while screen information is displayed on the display unit.

According to an embodiment, the controller may enlarge the screen information according to a degree of increase of the touch area of the touch input, and reduce the screen information according to a degree of reduction of the touch area of the touch input while the screen information is displayed on the display unit.

According to an embodiment, when a preset type of touch input is applied while the illumination of the display unit is turned off, the controller may control the display unit to turn on the display unit at a brightness corresponding to the touch area of the preset type of touch input.

According to an embodiment, when screen information is displayed on the display unit, and the touch input is released without changing the touch area, the controller may input specific information displayed on a region to which the touch input is applied among the screen information in response to the touch input being released.

According to an embodiment, when the touch input is released subsequent to changing the touch area of the touch input, the controller may limit an input of specific information displayed in a region to which the touch input is applied in response to the touch input being released.

According to an embodiment, the controller may display different screen information on the display unit according to a degree of change of the touch area of the touch input, and select screen information displayed on the display unit at the time of the release of the touch input when the touch input is released.

According to an embodiment, while screen information is displayed in a first size on the display unit, the controller may display the screen information in a second size larger than the first size when the touch area of the touch input increases, and display the screen information in a third size smaller than the first size when the touch area of the touch input decreases.

According to another embodiment of the present disclosure, there is provided a method of controlling a terminal, and the method may include sensing a touch area of a touch input applied to a display unit, detecting a change direction of a touch area of the touch input, and executing a specific function associated with a change direction of the touch area among a plurality of functions for controlling the operation of the terminal.

According to an embodiment, the specific function for controlling the operation of the watch-type terminal may be any one of a cancel function for canceling the execution of a function currently being executed, a home function for displaying a home screen page, and a menu function for displaying a setting menu.

According to an embodiment, said detecting a change direction of the touch area may include calculating a center point of the touch area prior to the change of the touch area, sensing a change of the touch area, calculating a center point of the changed touch area subsequent to the change of the touch area, and calculating a movement direction of the center point of the touch area prior to the change and the center point of the touch area subsequent to the change as a change direction of the touch area.

According to an embodiment, the method may further include executing a function related to information displayed on a region to which a touch input is applied when the touch input is released while a change of the touch area is not sensed.

The present disclosure may control the operation of the mobile terminal associated with a change direction of a touch attribute of the touch input using a touch attribute change of the touch input. Accordingly, the present disclosure may control the operation of the mobile terminal using a change in a touch attribute of the touch input, without displaying visual information, in the mobile terminal with a small display unit having a limited display amount.

In addition, the present disclosure may control the display of visual information displayed on the display unit using an area change of the touch input. As a result, the present disclosure may change a display state of visual information without multiple times of touch inputs, even with only one touch input.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
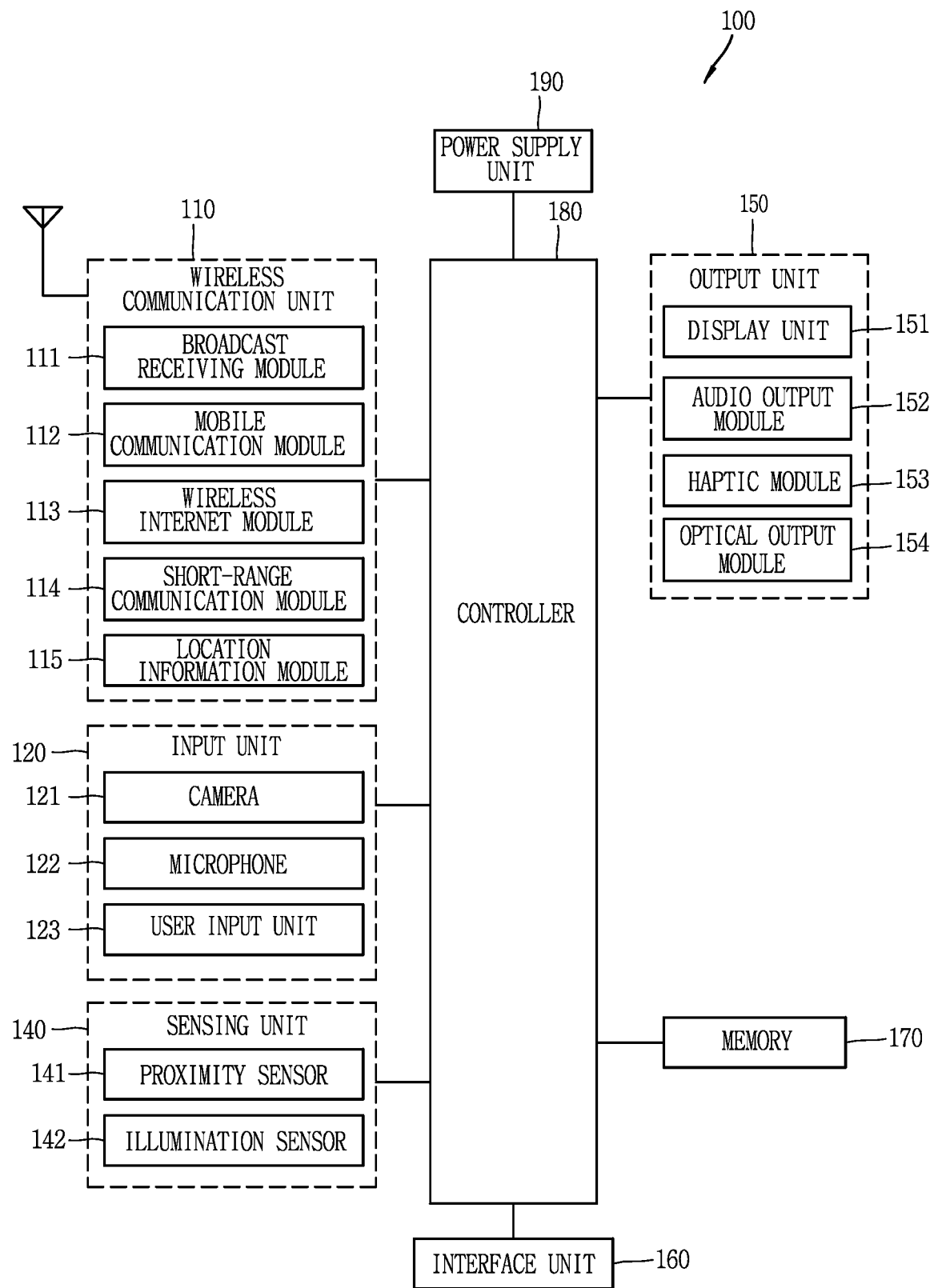
FIG. 1A is a block diagram for explaining a mobile terminal associated with the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function.

In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
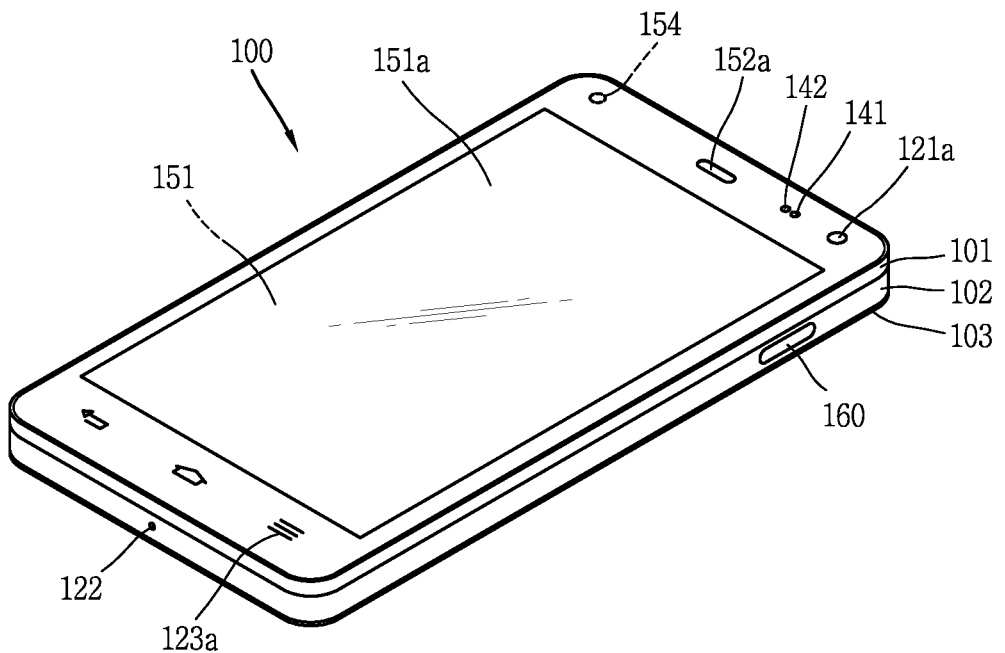
FIGS. 1B and 1C are conceptual views illustrating an example in which a mobile terminal associated with the present disclosure is seen from different directions.
Figure 1C:
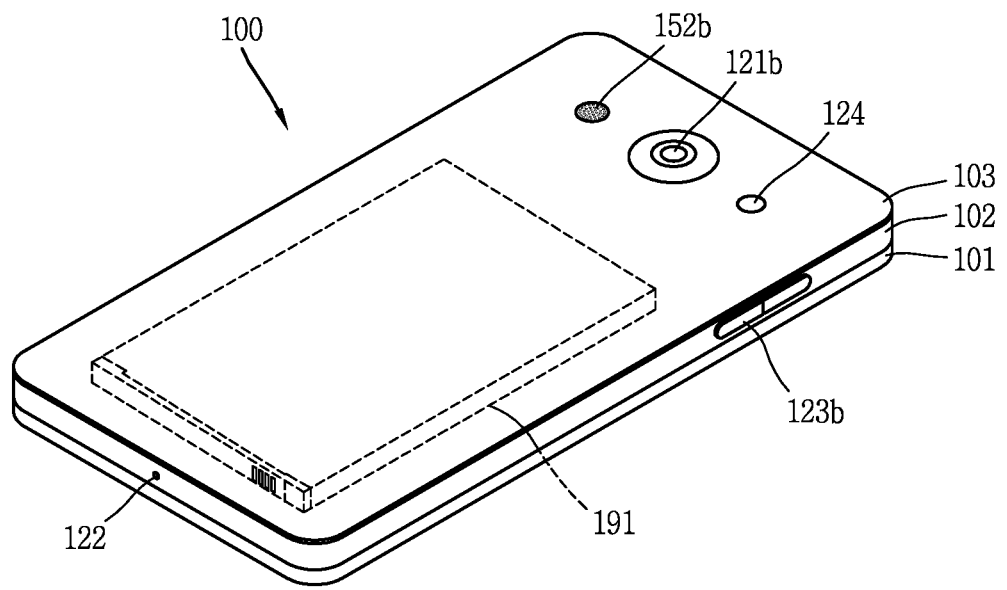

Referring to FIGS. 1A through 1C, FIG. 1A is a block diagram for explaining a mobile terminal associated with the present disclosure, and FIGS. 1B and 1C are conceptual views illustrating an example in which the mobile terminal associated with the present disclosure is seen from different directions.

The mobile terminal 100 may include components, such as a wireless communication unit 110, an input unit 120, a sensing unit 140, an output unit 150, an interface unit 160, a memory 170, a controller 180, a power supply unit 190 and the like. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which is able to exchange data with the mobile terminal 100 (or to link data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

The input unit 120 may be configured to provide an audio or video signal (or information) input to the mobile terminal or information input by a user to the mobile terminal. For the input of the audio information, the mobile terminal 100 may include one or a plurality of cameras 121. The camera 121 processes a image frame, such as still picture or video, acquired by an image sensor in a video phone call or image capturing mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The camera 121 and the laser sensor may be combined to detect a touch of the sensing object with respect to a 3D stereoscopic image. More specifically, the photo sensor is integrated with photo diodes and transistors in the rows and columns thereof, and a content placed on the photo sensor may be scanned by using an electrical signal that is changed according to the amount of light applied to the photo diode. Namely, the photo sensor may calculate the coordinates of the sensing object according to variation of light to thus obtain position information of the sensing object.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Figure 10:
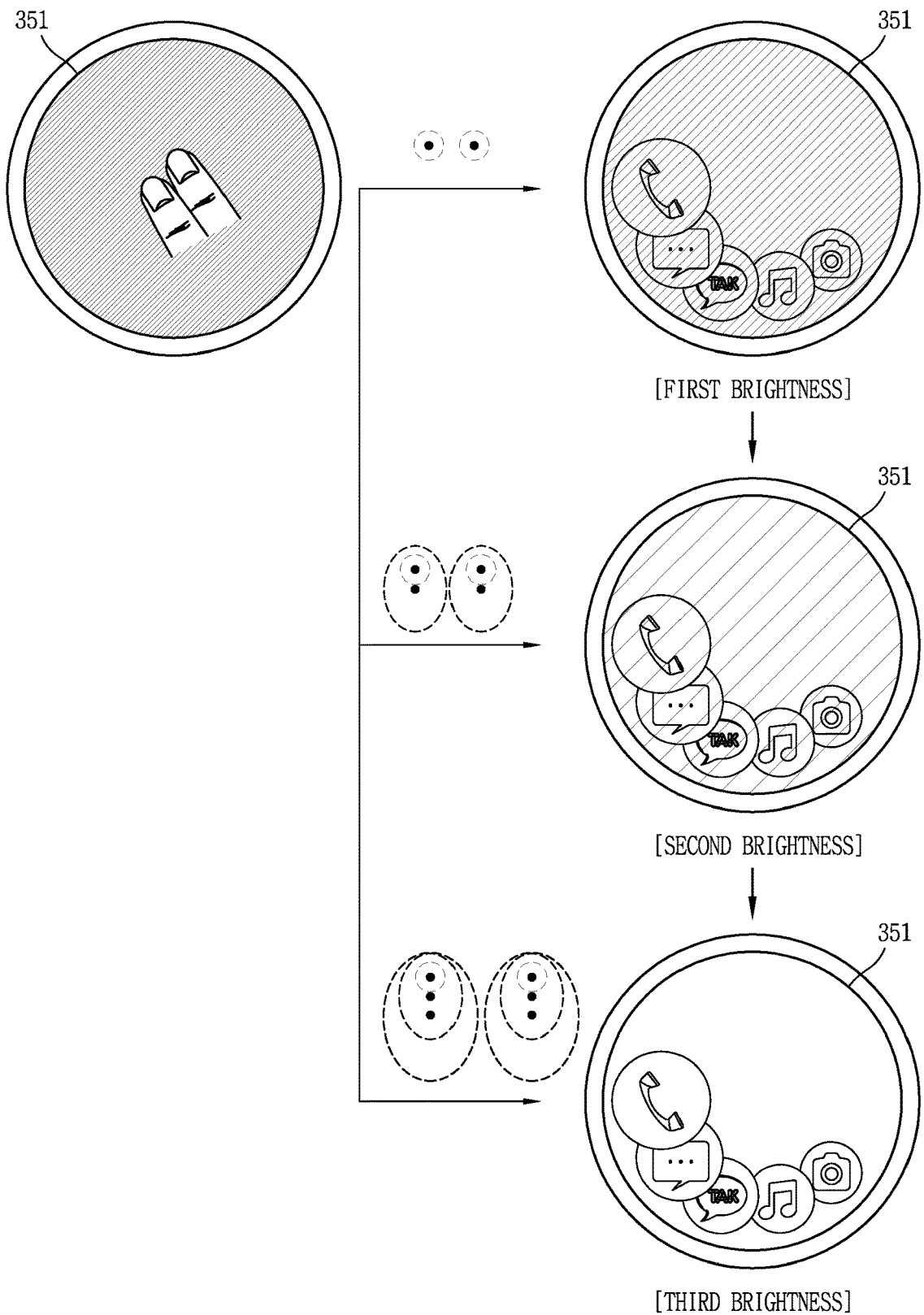
FIG. 10 is a conceptual view illustrating a method of controlling the brightness of a display unit according to a touch attribute of a touch input when a user turns on the display unit through a touch input to a watch-type terminal.

Referring to FIGS. 1B and 10, the mobile terminal 100 disclosed herein may be provided with a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 10.

However, the foregoing configuration may not be necessarily limited to the arrangement. The foregoing configuration may be excluded, substituted or disposed on another surface if necessary. For example, the first manipulation unit 123*a* may not be disposed on the front surface of the terminal body, and the second audio output module 152*b* may be disposed on the side surface other than the rear surface of the terminal body.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a receiver for transferring voice sounds to the user's ear or a loud speaker for outputting various alarm sounds or multimedia reproduction sounds.

The window 151*a* of the display unit 151 may include a sound hole for emitting sounds generated from the first audio output module 152*a*. Here, the present disclosure may not be limited to this. It may also be configured such that the sounds are released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the controller 180 may control the optical output unit 154 to end the output of light.

The first camera 121*a* may process video frames such as still or moving images acquired by the image sensor in a video call mode or a capture mode. The processed video frames may be displayed on the display unit 151 or stored in the memory 170.

The first and second manipulation units 123*a* and 123*b* are examples of the user input unit 123, which may be manipulated by a user to input a command for controlling the operation of the mobile terminal 100. The first and second manipulation units 123*a* and 123*b* may employ any method if it is a tactile manner allowing the user to perform manipulation with a tactile feeling such as touch, push, scroll or the like. In addition, the first and second manipulation units 123*a* and 123*b* may also employ a method of allowing the user to perform manipulation without a tactile feeling through a proximity touch, a hovering touch, or the like.

The drawings are illustrated on the basis that the first manipulation unit 123*a* is a touch key, but the present disclosure may not be necessarily limited to this. For example, the first manipulation unit 123*a* may be configured with a mechanical key, or a combination of a touch key and a push key.

The content received by the first and second manipulation units 123*a* and 123*b* may be set in various ways. For example, the first manipulation unit 123*a* may be used by the user to input a command such as menu, home key, cancel, search, or the like, and the second manipulation unit 123*b* may be used by the user to input a command, such as controlling a volume level being output from the first or second audio output module 152*a* or 152*b*, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152*a* or 152*b*, switching into a touch recognition mode of the display unit 151, or the like. The rear input unit may be implemented into a form allowing a touch input, a push input or a combination thereof.

The rear input unit may be disposed to overlap with the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123*a* located on the front surface of the terminal body. Accordingly, when the first manipulation unit 123*a* is not disposed on the front surface of the terminal body, the display unit 151 may be implemented to have a larger screen.

On the other hand, the mobile terminal 100 may include a fingerprint recognition sensor for recognizing a user's fingerprint, and the controller 180 may use fingerprint information sensed through the finger recognition sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may link with the display unit 151 to extend the function of the mobile terminal 100. Another example of the accessory may be a touch pen for assisting or extending a touch input onto a touch screen.

On the other hand, a mobile terminal may extend to a wearable device which is wearable on a human body, going beyond usually using the mobile terminal by a user with grabbing it with a hand. Examples of the wearable device may include a smart watch, a smart glass, a head mounted display (HMD), and so on. Hereinafter, description will be given of examples of a mobile terminal extending to the wearable device.

A wearable device may be configured to exchange data with (or link with) another mobile terminal 100. The short-range communication module 114 may sense (recognize) a wearable device capable of communicating with the mobile terminal in the vicinity of the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
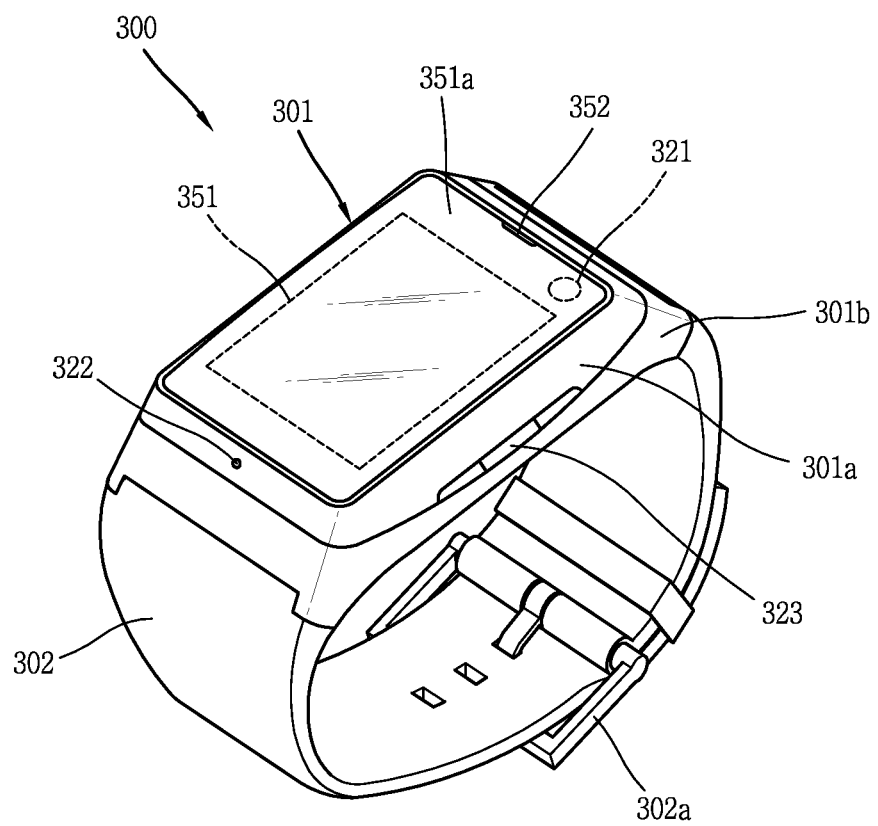
FIG. 2 is a perspective view illustrating an example of a watch-type mobile terminal 300 associated with another embodiment of the present disclosure.

FIG. 2 is a perspective view illustrating one example of a watch type mobile terminal 300 in accordance with another exemplary embodiment.

As illustrated in FIG. 2, the watch type mobile terminal 300 may include a main body 301 with a display unit 351, and a band 302 connected to the main body 301 to be wearable on a wrist. In general, the mobile terminal 300 may include the features of the mobile terminal 100 in FIGS. 1A through 1C or similar features thereof.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, a window 351a of the display unit 351 may be mounted onto the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as the touch screen, it may function as the user input unit 323, which may result in excluding a separate key on the main body 301.

The band 302 may be worn on the wrist in a surrounding manner. The band 302 may be made of a flexible material for facilitating the wearing. The band 302 is commonly worn on the user's wrist and may be made of a flexible material for facilitating wearing of the device. The band 302 may also be configured to be detachable from the main body 301. Accordingly, the band 302 may be replaceable with various types of bands according to a user's preference.

On the other hand, the band 302 may be used for extending the performance of the antenna. For example, the band may include therein a ground extending portion (not shown) electrically connected to the antenna to extend a ground area.

The band 302 may be provided with a fastener 302a. The fastener 302a may be implemented into a buckle type, a snap-fit hook structure, a Velcro type, or the like, and include a flexible section or material. The drawing illustrates an example that the fastener 302a is implemented into the buckle type.

Hereinafter, embodiments associated with a control method which can be implemented in the mobile terminal having the foregoing configuration will be described with reference to the attached drawings. It should be understood by those skilled in the art that the present disclosure can be embodied in other specific forms without departing from the concept and essential characteristics thereof.

In the following description, the drawings will be described in sequence in a clockwise direction or described in sequence from the top to the bottom based on the upper left drawing. Furthermore, in the following description and drawings, a watch-type terminal will be mainly described, but the present disclosure is not limited thereto, but may be equally applicable to various types of mobile terminals.

The watch-type terminal according to the present disclosure may sense a change in the touch attribute of the touch input applied to the watch-type terminal.

To this end, the watch-type terminal according to the present disclosure may include a display unit 351, a sensing unit 140, and a controller 180.

The display unit 351 may be formed not only to display visual information but also to allow a user to apply a touch input. In addition, the display unit 351 may have various shapes such as a circle or a rectangle.

The sensing unit 140 may sense a touch input applied to the display unit 351. In other words, the sensing unit 140 may sense the touch attribute of the touch input. More specifically, the sensing unit 140 may sense a touch area of the touch input, a change direction of the touch area, a touch pressure, and a change direction of the touch pressure. Here, the change direction of the touch area may be any one of a decreasing direction or an increasing direction of the touch area. The change direction of the touch pressure may be any one of an increasing direction of the touch pressure or a decreasing direction of the touch pressure.

The controller 180 may control the operation of the watch-type terminal in response to a user's control command input through the display unit 351 and the sensing unit 140.

The operation of the watch-type terminal includes an operation of canceling a function being executed in the watch-type terminal, an operation of entering a setting menu of the watch-type terminal, an operation of entering a home screen page, an operation of providing a thumbnail image corresponding to an application that has been recently executed, and the like.

More specifically, the operation of canceling the function being executed in the watch-type terminal may be an operation of ending a function being executed, or returning to a state prior to the execution of an application currently being executed, or ending an application currently being executed, and entering an application that has been executed prior to the execution of an application currently being executed.

The operation of entering into a setting menu of the watch-type terminal may be an operation of displaying a menu list related to the environment setting of the watch-type terminal or displaying a menu list related to an application currently being executed in the watch-type terminal. Here, the environment setting may include settings related to the use of the watch-type terminal, such as a sound and screen setting of the watch-type terminal, a communication connection setting, and an input method setting of the watch-type terminal, and the like.

The operation of providing a thumbnail image corresponding to the application that has been recently executed may be an operation of displaying on the display unit the thumbnail image corresponding to an application that has been recently executed in the mobile terminal. Here, the application that has been recently executed may be an application currently being executed or an application that has been executed prior to the execution of an application currently being executed.

Figure 3:
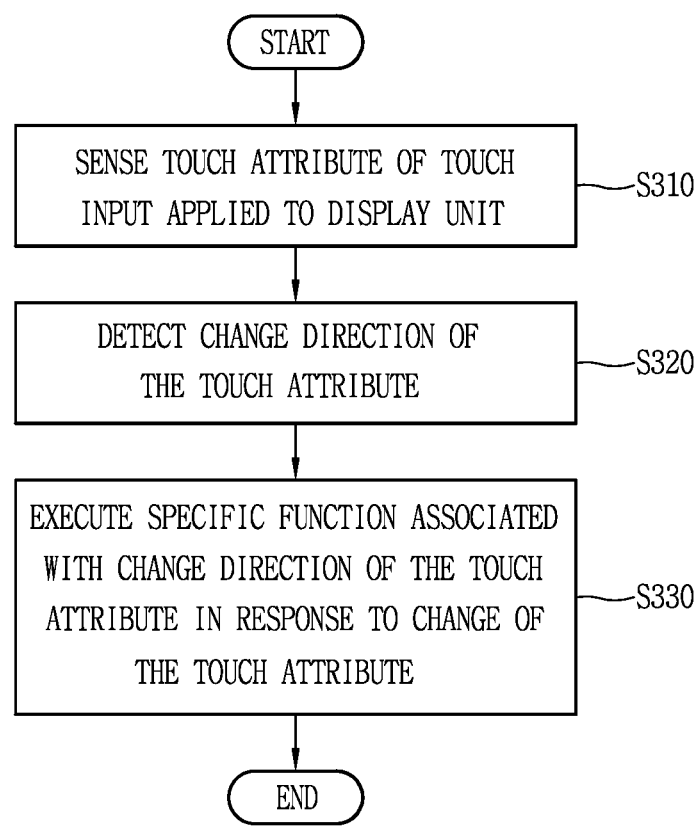
FIG. 3 is a flowchart illustrating a method of controlling the operation of a watch-type terminal according to a change in a touch attribute of a touch input in a watch-type terminal according to the present disclosure.
Figure 4A:
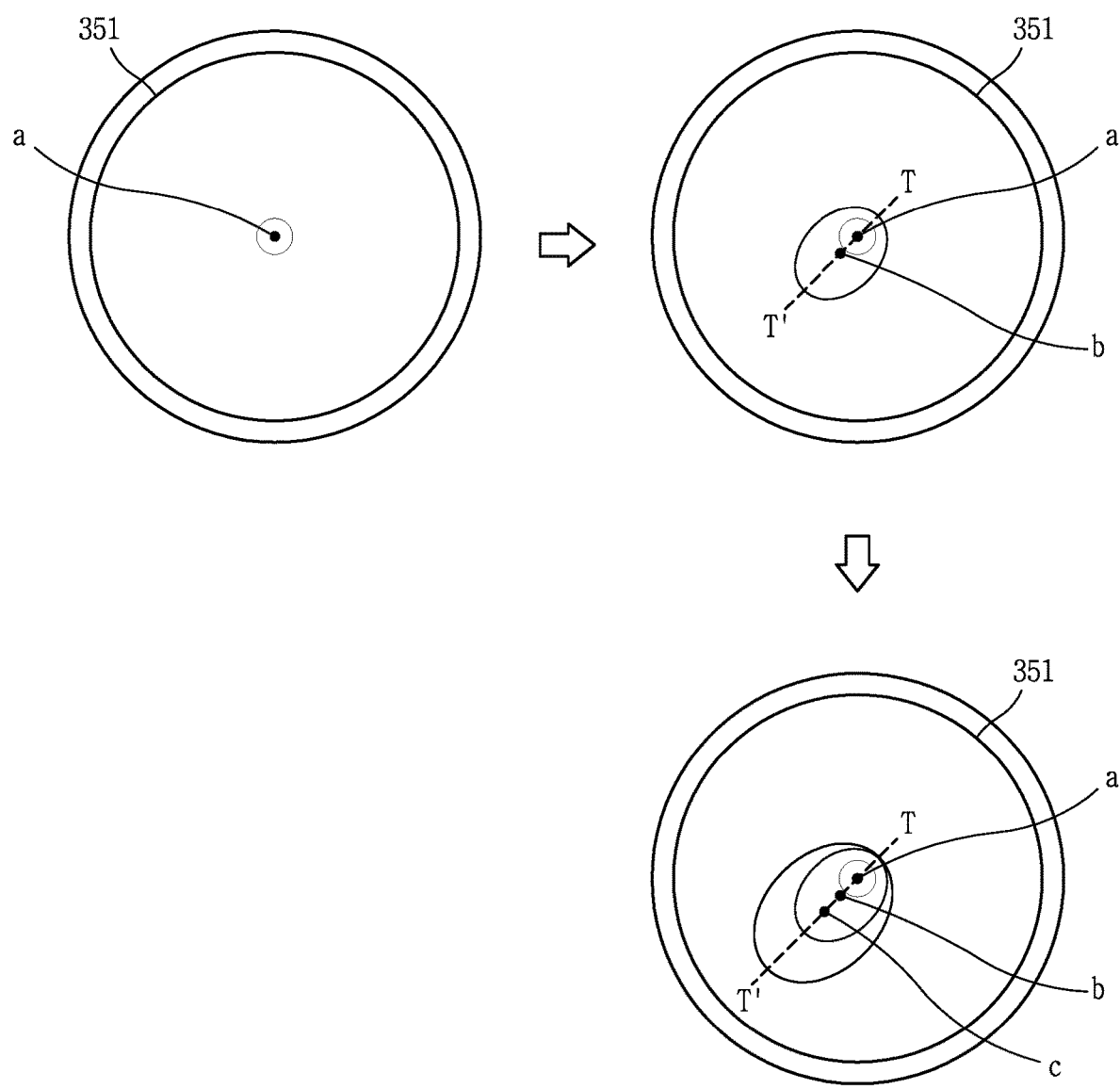
FIGS. 4A, 4B, and 4C are conceptual views illustrating a change in a touch area of a touch input in a watch-type terminal according to the present disclosure.
Figure 4B:
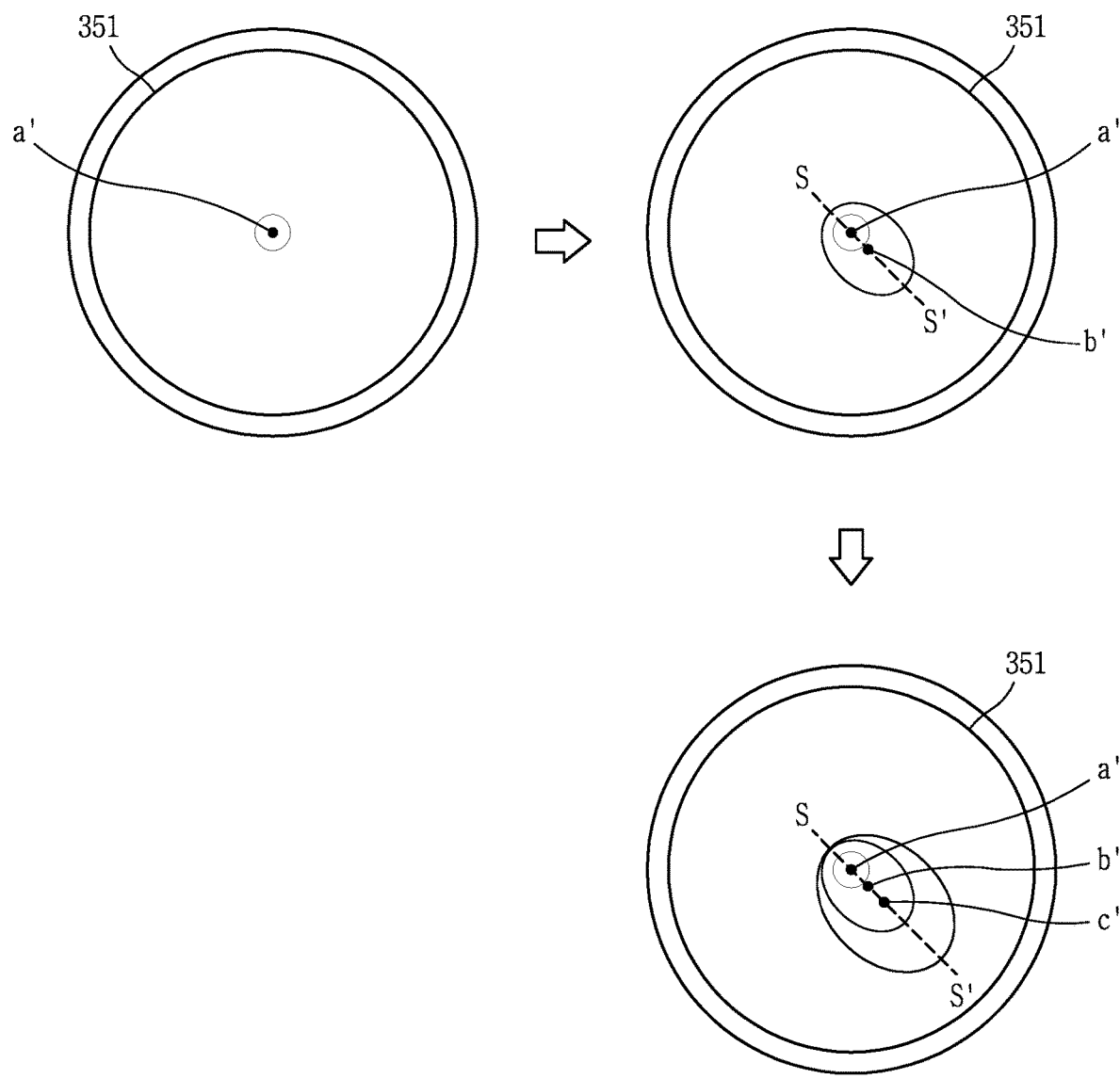
Figure 4C:
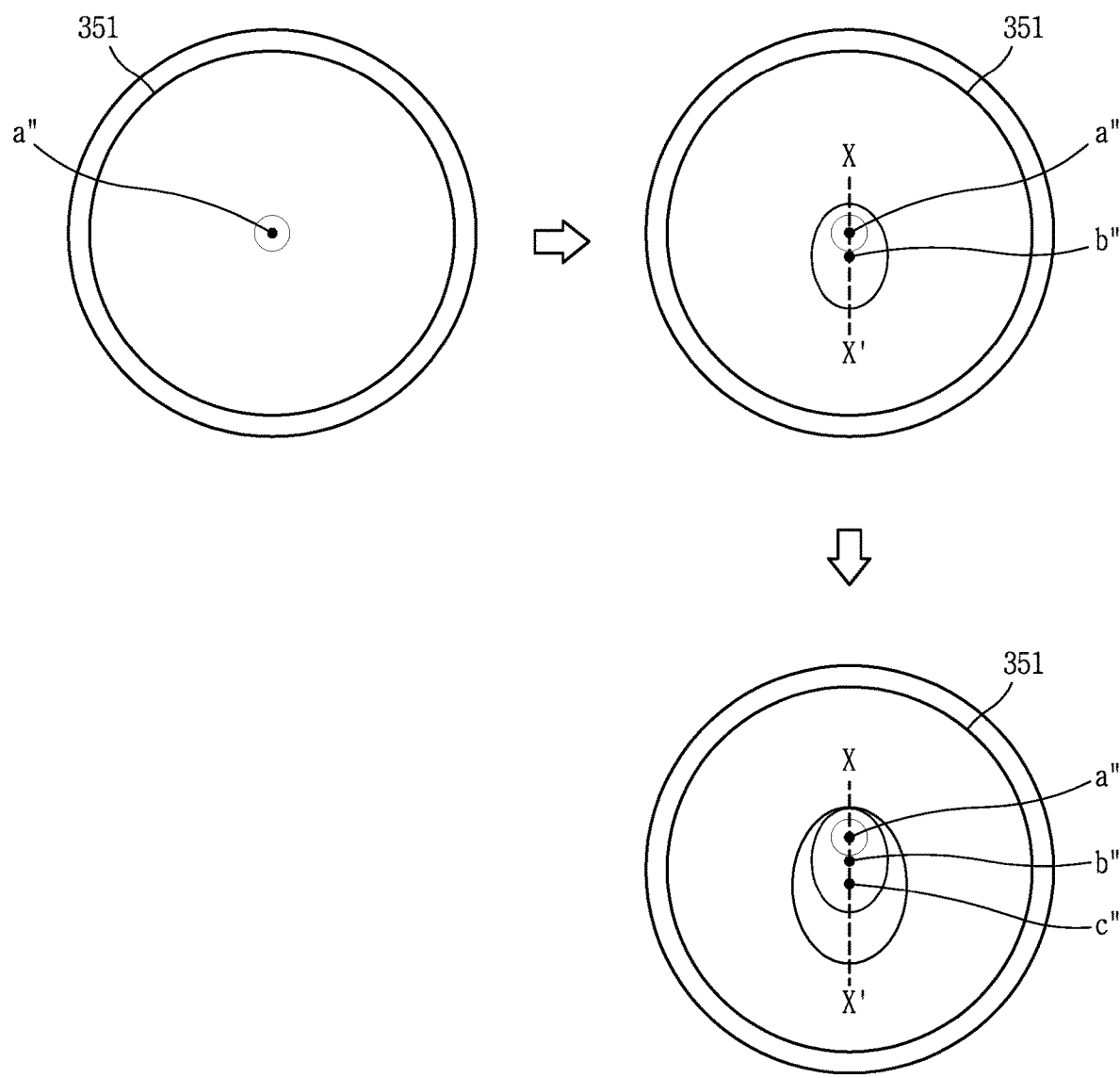

Hereinafter, a method for controlling the operation of the watch-type terminal according to a touch area of a touch input applied to the display unit 351 of the watch-type terminal will be described in more detail. FIG. 3 is a flowchart illustrating a method of controlling the operation of a watch-type terminal according to a change in a touch attribute of a touch input in a watch-type terminal according to the present disclosure. FIGS. 4A, 4B, and 4C are conceptual views illustrating a change in a touch area of a touch input in a watch-type terminal according to the present disclosure.

First, the present disclosure may sense a touch attribute of a touch input applied to the display unit (S310).

The user may apply a touch input through the display unit 351 of the watch-type terminal. In addition, the user may apply a touch input through the band portion and buckle portion of the watch-type terminal in addition to the display unit 351.

When a touch input is applied to the display unit 351, the controller 180 may sense a touch attribute of the touch input through the sensing unit 140. The touch attribute may include a touch area occupied by the touch input and a touch pressure of the touch input applied in a direction perpendicular to the display unit 351 on the display unit 351. For example, when a touch input is applied, the sensing unit 140 may sense a touch area of the touch input.

The sensing unit 140 may transmit sensing information corresponding to the touch input to the controller 180 when the touch input is sensed. The sensing information includes information related to the touch attribute of the touch input. For example, the information related to the touch attribute of the touch input may include information related to at least one of a touch area of the touch input, a center, coordinate (or a center point) of the touch area, and a touch pressure.

The controller 180 may receive sensing information corresponding to the touch input in real time. At this time, the controller 180 may determine whether or not at least one of the touch area and the touch pressure has changed based on the sensing information corresponding to the touch input. For example, the controller 180 may determine that the touch area has changed based on a change in the center coordinate of the touch area of the touch input. Here, the center coordinate of the touch area may be set to the center of a circle, the center of an ellipse, or the center of gravity of a figure, as a center point of the touch area.

When it is determined that the touch attribute of the touch input is changed, the present disclosure may detect a change direction of the touch attribute of the touch input (S320).

When it is determined that the touch attribute is changed based on sensing information received through the sensing unit 140, the controller 180 may detect a change direction of the touch attribute based on sensing information corresponding to the touch attribute of the touch input.

For example, when the center point of the touch area of the touch input is changed, the controller 180 may determine that the touch attribute is changed. In this case, the controller 180 may detect a movement direction of the center point of the touch area. Then, the controller 180 may set the movement direction of the center point of the touch area as a change direction of the touch area. Alternatively, the controller 180 may recognize a region in which a touch is recognized, and detect a change direction of the touch attribute through an increase or decrease of the recognized area.

At this time, when the movement direction of the center point is within a specific range, the controller 180 may set a specific direction corresponding to the specific range as a change direction of the touch area. The specific range is a preset range of the watch-type terminal.

For example, as illustrated in FIG. 4A, the controller 180 may sense that the center point of the touch input is moved to a first point (a), a second point (b), and a third point (c). In this case, the controller 180 may determine that each center point moves within a specific range corresponding to the southwest direction, and set the southwest direction to a change direction of the touch area.

For another example, as illustrated in FIG. 4B, the controller 180 may sense that the center point of the touch input is moved to a first point (a'), a second point (b'), and a third point (c'). In this case, the controller 180 may determine that each center point moves within a specific range corresponding to the southeast direction, and set the southeast direction to a change direction of the touch area.

For still another example, as illustrated in FIG. 4C, the controller 180 may sense that the center point of the touch input is moved to a first point (a"), a second point (b"), and a third point (c"). In this case, the controller 180 may determine that each center point moves within a specific range corresponding to the south direction, and set the south direction to a change direction of the touch area.

Furthermore, the controller 180 may detect a change direction of a touch pressure in a manner similar to the touch area. For example, the controller 180 may sense that the pressure becomes stronger in a direction toward a front surface of the display unit 351 or the pressure becomes weaker in a direction opposite to the direction toward the front surface of the display unit.

When the change direction of the touch attribute is detected, the present disclosure may execute a specific function associated with a change in a touch attribute of the touch input (S330).

The watch-type terminal according to the present disclosure may operate in either one of a first mode for controlling the operation of the watch-type terminal and a second mode for controlling a display state of screen information on the display unit in response to a change in the touch attribute of the touch input.

The first mode is a state of the watch-type terminal for providing a function of controlling the operation of the watch-type terminal. The function for controlling the operation of the watch-type terminal includes a cancel function for canceling a function being executed in the watch-type terminal, a menu function for entering a setting menu of the watch-type terminal, a home function for entering a home screen page, and a recently executed application function for providing a thumbnail image corresponding to an application that has been recently executed.

The second mode is a state of the watch-type terminal for providing a function of controlling a display state of screen information. The function of controlling a display state of screen information displayed on the display unit may be a zoom-in/zoom-out function for enlarging or reducing screen information displayed on the display unit 351.

An operation mode in which the watch-type terminal operates may be previously set at the factory of the watch-type terminal or may be set by the user.

When a change direction of the touch area of the mobile terminal is detected while the watch-type terminal operates in any one of the modes, the controller 180 may execute a specific function associated with a preset change of the touch attribute in each mode in response to a change in the touch attribute of the touch input.

On the other hand, a graphic object indicating the specific function may not be displayed on the display unit 351. In other words, the controller 180 may immediately execute a specific function associated with a change direction of the touch attribute of the touch input without displaying visual information.

Hereinafter, an embodiment of controlling the operation of the watch-type terminal according to a change in a touch attribute of the touch input will be described in more detail. FIGS. 5A through 5D are conceptual views illustrating the control method of FIG. 3.

First, the watch-type terminal according to the present disclosure may operate in a first mode for controlling the operation of the watch-type terminal based on a change in the touch attribute of the touch input.

When the watch-type terminal operates in the first mode, the controller 180 may execute a function of controlling the operation of the watch-type terminal based on a change direction of the touch attribute.

Figure 5A:
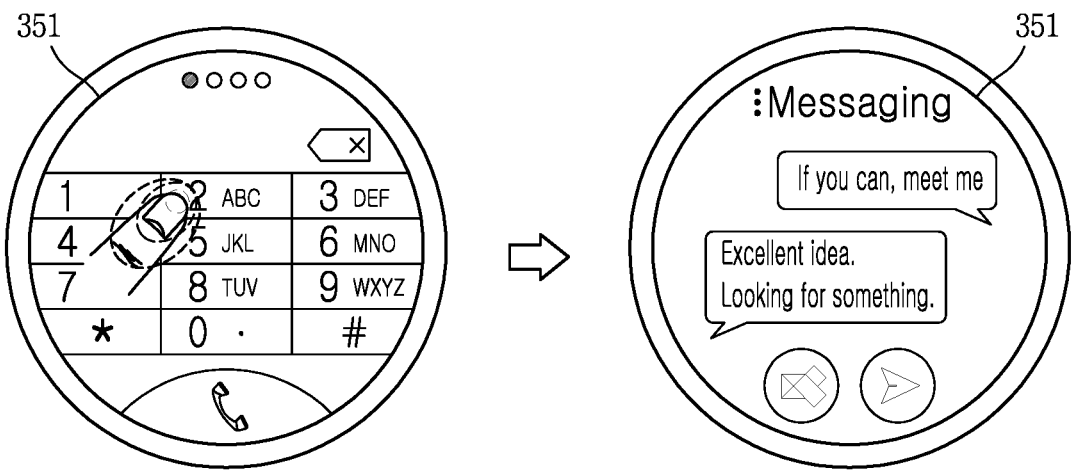
FIGS. 5A through 5D are conceptual views illustrating the control method of FIG. 3.

More specifically, the controller 180 may execute a cancel function for canceling a function currently being executed, based on a change direction of the touch attribute being sensed in a first direction. For example, as illustrated in FIG. 5A, when a change direction of a touch area of the touch input applied to the display unit 351 is a first direction while a call application is being executed, the controller 180 may enter a message application that has been executed prior to the execution of the call application. In this case, an execution screen of the call application may be switched to an execution screen of the message application on the display unit 351. Here, the call application is an application program that provides a function of transmitting and receiving a call signal to an external terminal through a communication network, and the message application is an application program that provides a function of transmitting and receiving a message to an external terminal through a communication network. Therefore, even when a graphic object indicating the cancel function is not displayed on the display unit 351, the user may execute the cancel function only by a simple touch input.

Figure 5B:
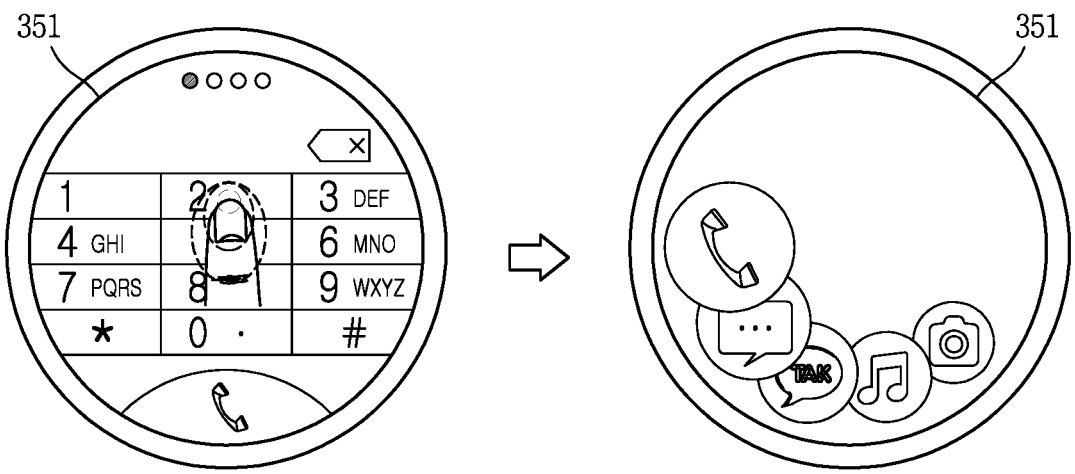

Furthermore, the controller 180 may execute a home function for entering a home screen page based on a change direction of the touch attribute being sensed in a second direction different from the first direction. For example, as illustrated in FIG. 5B, the controller 180 may enter a home screen page when the change direction of the touch area of the touch input is a second direction while the call application is being executed. In this case, a home screen page may be displayed on the display unit 351. Here, the home screen page as screen information displayed in a standby state of the watch-type terminal may include an icon and a widget indicating at least one of applications installed in the watch-type terminal.

In addition, the controller 180 may execute a recently executed application function for displaying a thumbnail image corresponding to applications, respectively, that has been recently executed, based on the change direction of the touch attribute being sensed in a third direction different from the first direction and the second direction. For example, as illustrated in FIG. 5C, the controller 180 may display a thumbnail image corresponding to applications, respectively, that has been recently executed, on the display unit 351, based on the change direction of the touch area being sensed in a third direction.

Figure 5C:
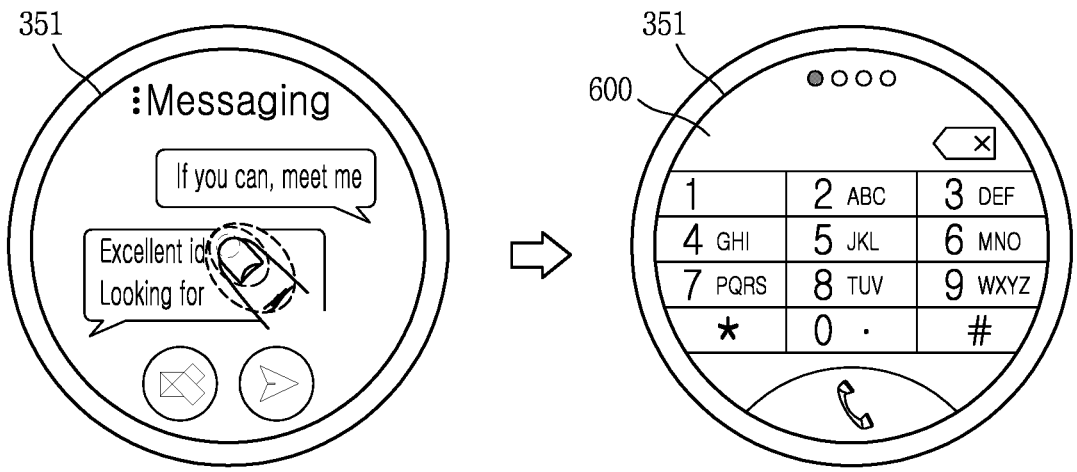
Figure 5D:
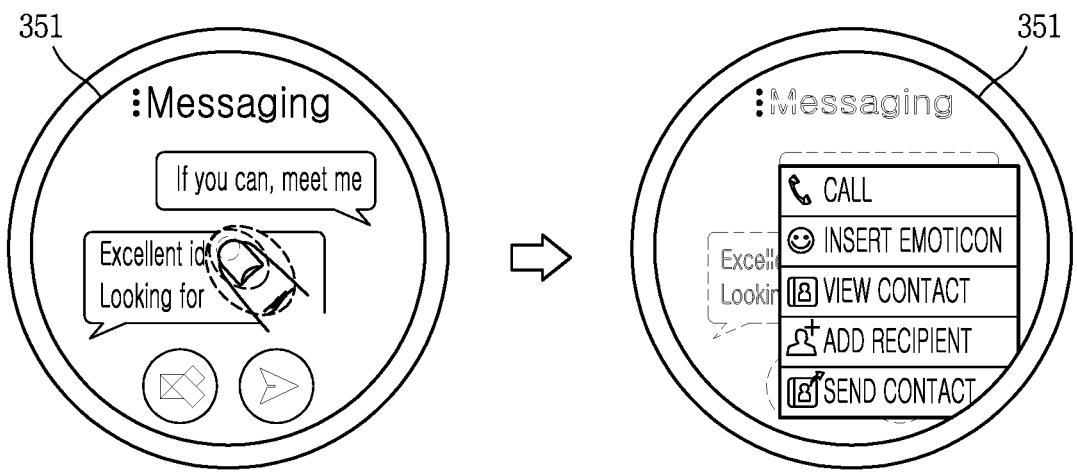

On the other hand, unlike FIG. 5C, the controller 180 may execute a menu function for entering a setting menu based on the change direction of the touch attribute being sensed in a third direction. For example, as illustrated in FIG. 5D, when the change direction of the touch area of the touch input applied to the display unit 351 is a third direction while the message application is being executed, the controller 180 may display a menu list including menu items related to the message application on the display unit 351. For example, the menu items related to the message application may be an emoticon insert menu, a contact view menu, a recipient add menu, a contact send menu, and the like.

Whether to execute which one of a recently executed application function or a menu function may vary according to the design of the designer of the watch-type terminal. In the present disclosure, an embodiment in which a recently executed application function is carried out will be mainly described, but it will be applicable to a case where a menu function is carried out.

Although not shown, the controller 180 may perform a different function according to a change direction of the touch pressure. For example, the controller 180 may execute a function related to information displayed in a region to which the touch input is applied in response to the touch pressure of the touch input becoming stronger in a first direction toward the front surface of the display unit 351. For another example, the controller 180 may execute a preview function related to information displayed in a region to which the touch input is applied in response to the touch input applied to the display unit 351 being weakened in a second direction opposite to a direction toward the front surface of the display unit 251.

On the other hand, contrary to the above examples, the controller 180 may perform a function corresponding to screen information displayed in a region to which the touch input is applied in response to the touch input being released without changing the touch attribute of the touch input. For example, when a touch is sensed in a region where a specific number is displayed on the display unit 151 while screen information for entering a number is displayed on the display unit, the controller 180 may execute a function of entering the specific number in response to the touch pressure and touch area of the touch input not being changed.

Accordingly, the user may execute various functions by changing or not changing the touch attribute of the touch input.

In the above, a method of controlling the operation of the watch-type terminal according to the touch attribute of the touch input has been described. Accordingly, the present disclosure may control the operation of the watch-type terminal using a change in a touch attribute of the touch input, without displaying visual information, in the watch-type terminal with a small display unit having a limited display amount.

Hereinafter, a method of re-executing a specific function or executing an additional function based on the touch input being continuously sensed subsequent to sensing a change in a touch attribute of the touch input will be described. FIGS. 6A through 6D are conceptual views illustrating a method of re-executing a specific function or executing an additional function based on the touch input being continuously sensed subsequent to sensing a change in a touch attribute of the touch input.

In the watch-type terminal according to the present disclosure, the controller 180 may execute a specific function associated with a change direction of the touch attribute in response to a change of the touch attribute of the touch input.

Furthermore, when the touch input is continuously sensed without being released subsequent to the execution of the specific function, the controller 180 may re-execute the specific function or execute an additional function. Here, the additional function may be a function previously associated with the change direction of the touch attribute. For example, the additional function may be a voice recognition function, a multi-window switch function, or the like.

When the touch input is released, the controller 180 may no longer perform a specific function or an additional function associated with a change direction of the touch attribute. The touch input being released may denote a state in which the touch input is no longer sensed through the sensing unit 140.

Figure 6A:
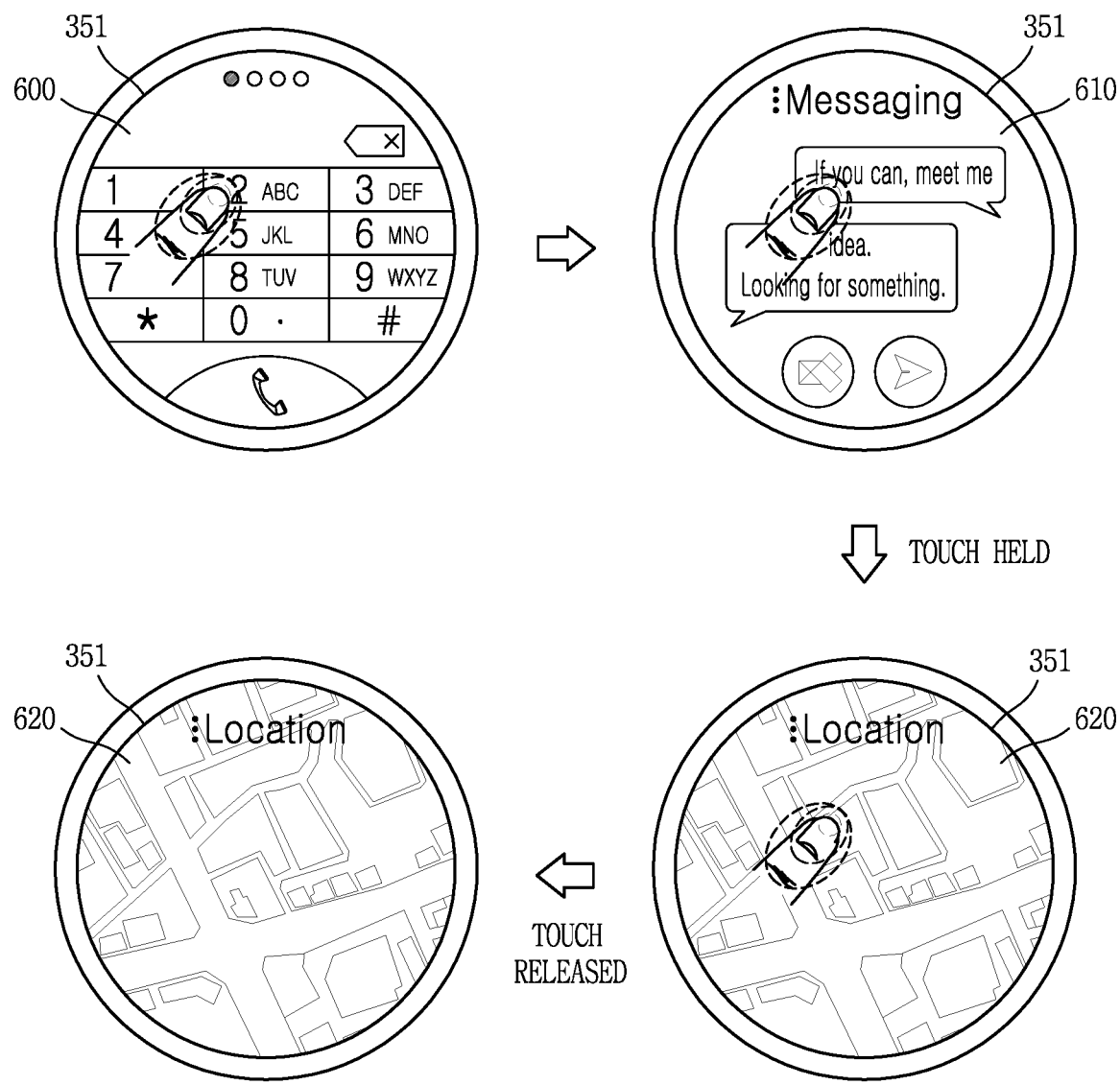
FIGS. 6A through 6D are conceptual views illustrating a method of executing a specific function for controlling the operation of the watch-type terminal according to a change in a touch attribute of a touch input.

For example, as illustrated in the first drawing of FIG. 6A, when a touch area of a touch input applied to the display unit 351 is changed to a first direction while an execution screen 600 of a call application is displayed, the controller 180 may execute a cancel function. In this case, as illustrated in the second drawing of FIG. 6A, the controller 180 may enter a message application that has been executed prior to the execution of the call application, and display an execution screen 610 of the message application on the display unit 351.

In a state where the execution screen 610 of the message application is displayed, the controller 180 may continuously sense a touch area of the touch input with the last sensed size.

In this case, the controller 180 may execute the cancel function again in response to the touch input being continuously sensed for a predetermined time with a changed touch area. In this case, as illustrated in the second drawing of FIG. 6A, the controller 180 may execute a map application that has been executed prior to the execution of the message application, and display an execution screen 620 of the map application on the display unit 351.

Furthermore, as illustrated in the fourth drawing of FIG. 6A, the controller 180 may display the execution screen 620 of the map application on the display unit 351 as it is in response to the touch input being released. In other words, when the touch input is released, the controller 180 may no longer perform the cancel function.

Figure 6B:
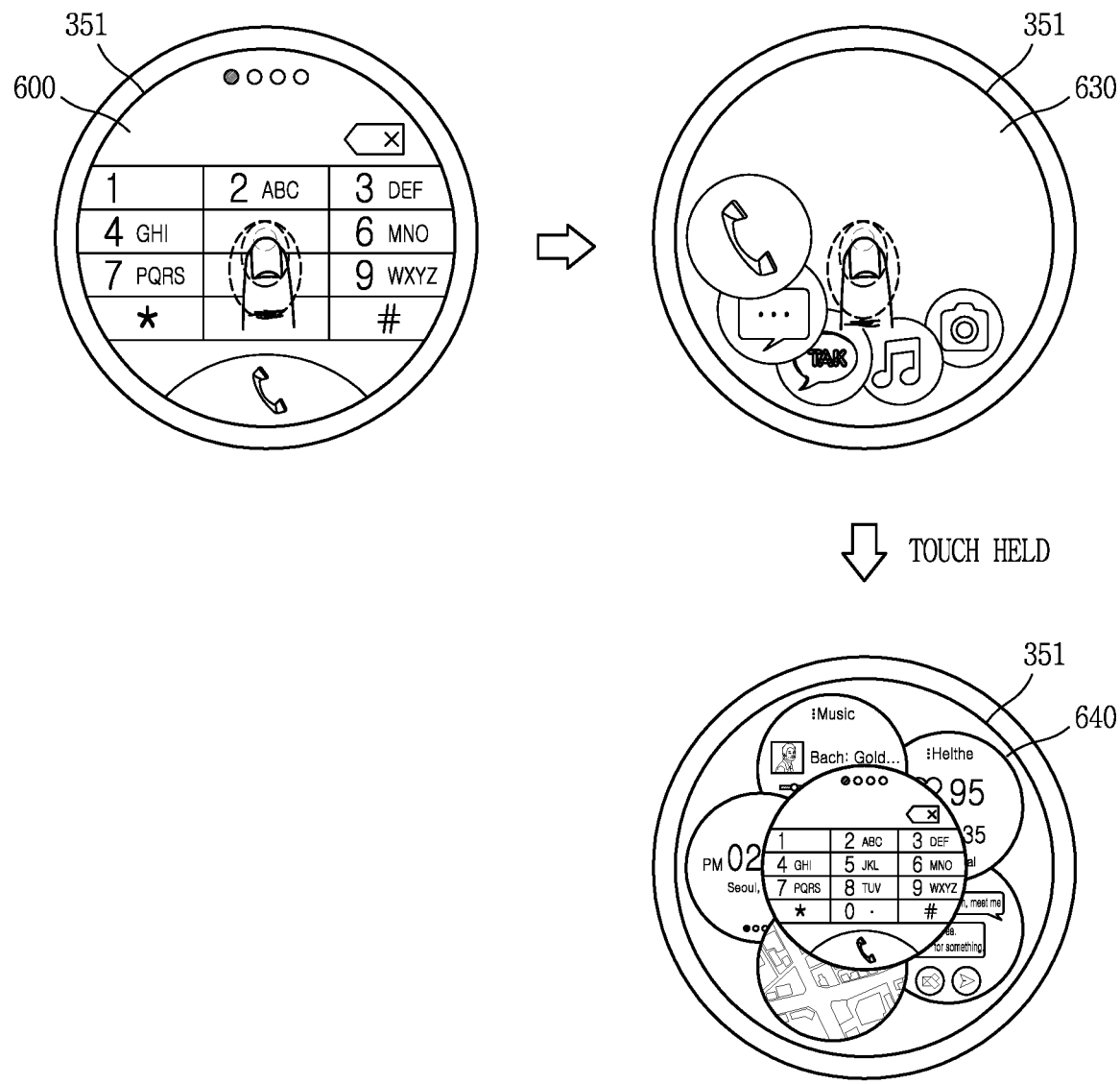

For another example, as illustrated in the first drawing of FIG. 6B, the controller 180 may execute a home function in response to a touch area of a touch input being applied to the display unit 351 is changed to a second direction while an execution screen 600 of a call application is displayed. In this case, as illustrated in the second drawing of FIG. 6B, the execution screen 600 of the call application may be switched to the home screen page 630 and displayed on the display unit 351.

Subsequent to the execution of the home function, the controller 180 may perform an additional function in response to the touch area of the touch input being continuously sensed with the last sensed size. For example, as illustrated in the third drawing of FIG. 6B, the controller 180 may execute a news function for providing news information or the like in response to the touch area of the touch input being continuously sensed with the last sensed size.

Figure 6C:
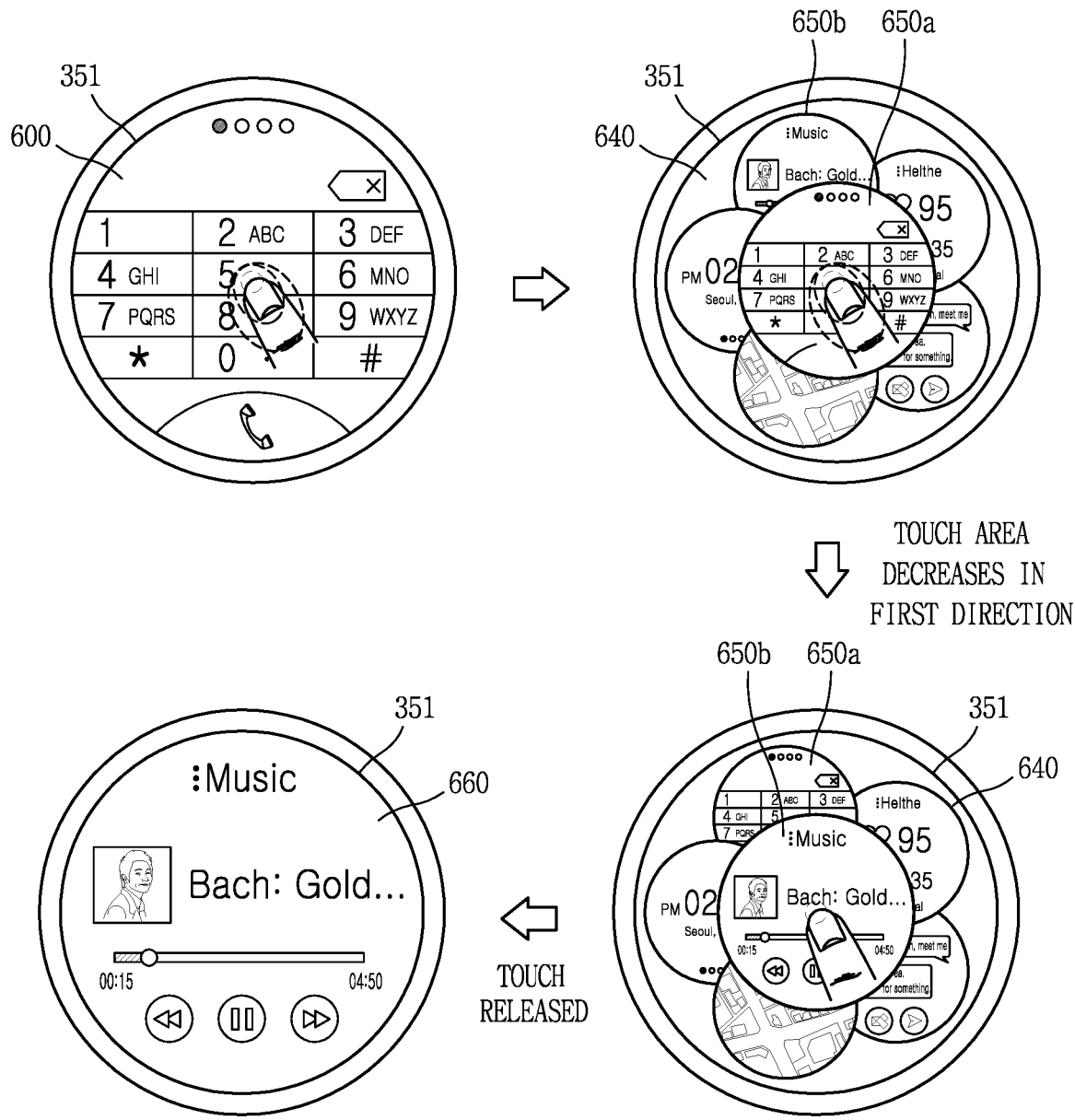

For still another example, as illustrated in the third drawing of FIG. 6C, the controller 180 may execute a recently executed application function in response to sensing that the touch area of the touch input is changed to a third direction. In this case, thumbnail images 650a, 650b corresponding to recently executed applications may be displayed on the display unit 351. A list including thumbnail images corresponding to recently executed applications will be referred to as term "app list 640."

The controller 180 may select any one of a plurality of items included in the app list based on a change direction of the touch area while the app list 640 is displayed. Here, the plurality of items included in the app list may correspond to respective thumbnail images.

For example, as illustrated in the second drawing of FIG. 6C, the controller 180 may deselect a thumbnail image 650a of the call application and select a thumbnail image 650b of the music application in response to sensing that the touch area of the touch input that has been changed to the third direction is changed back to the first direction while the thumbnail image 650a of the call application included in the app list 640 is selected. In other words, the user may change the touch area of the touch input to select a desired item among the plurality of items included in the app list 640.

In addition, the controller 180 may execute an application corresponding to any one of the items in response to the touch input being released while any one of the plurality of items included in the app list 640 is selected.

For example, as illustrated in the third drawing of FIG. 6C, the controller 180 may execute a music application in response to the touch input being released while the thumbnail image 650b of the music application is selected. In this case, an execution screen 660 of the music application may be displayed on display unit 351.

Figure 6D:
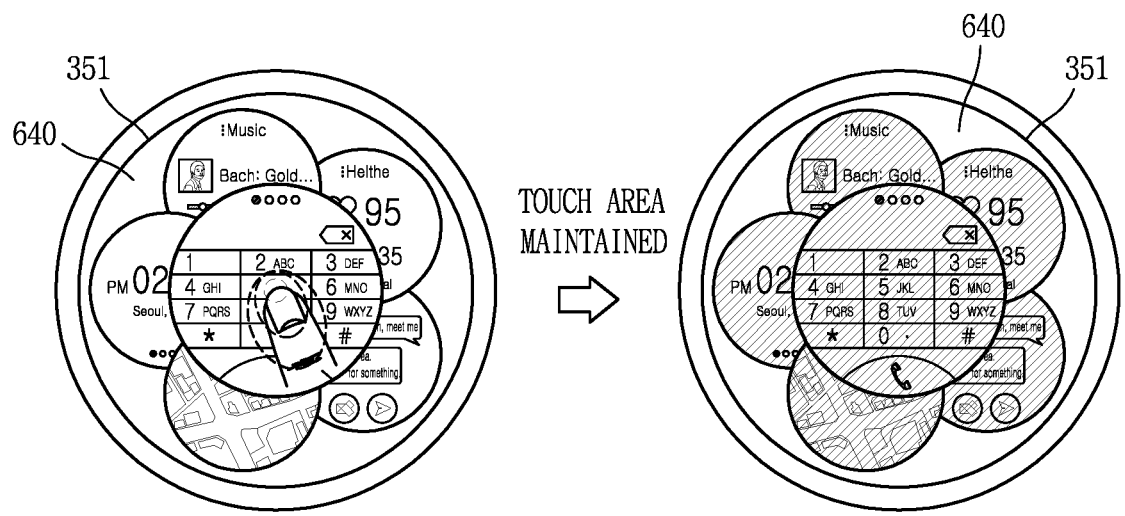

Moreover, as illustrated in FIG. 6D, the controller 180 may select all the plurality of items included in the app list 640 in response to sensing that the touch area of the touch input is sensed for a preset period of time with the last sensed size while the app list 640 is displayed.

Then, although not shown, the controller 180 may terminate the execution of applications corresponding to a plurality of items, respectively, included in the app list 640 at the same time in response to a drag input being applied in a preset direction while the plurality of items included in the app list 640 are selected.

In the above, a method of executing a specific function of controlling the operation of the watch-type terminal according to a change in a touch attribute of the touch input has been described.

Hereinafter, a method of controlling screen information displayed on the display unit according to a change direction of the touch area of the touch input will be described. FIGS. 7A through 9B are conceptual views illustrating a method of controlling screen information displayed on the display unit according to a change direction of a touch area of a touch input.

The watch-type terminal according to the present disclosure may operate in a second mode for controlling screen information displayed on the display unit based on a change in a touch attribute of the touch input.

When the watch-type terminal operates in the second mode, the controller 180 may execute a function of controlling screen information displayed on the display unit based on a change direction of the touch attribute. Here, controlling screen information may denote controlling the display state of the screen information, such as display size, display accuracy, display color, enlargement or reduction and the like.

Figure 7A:
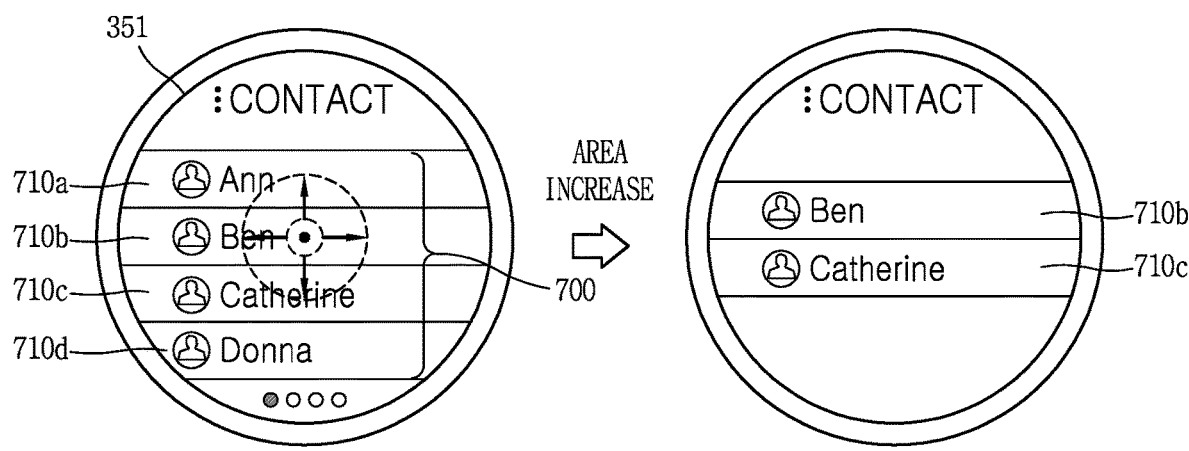
FIGS. 7A through 9B are conceptual views illustrating a method of controlling a display state of screen information according to a change direction of a touch area of a touch input.

For example, as illustrated in FIG. 7A, the controller 180 may display only items 710b, 710c having high importance levels among the items corresponding to a plurality of phone numbers included in a contact list 700 in response to an increasing touch area of the touch input while the contact list 700 including the items 710a, 710b, 710c, 710d corresponding to the plurality of phone numbers is displayed. In other words, items having low importance levels may be allowed to disappear on the display unit 351.

Here, the importance levels of the items may be set by a use frequency of each item or by the user. For example, the controller 180 may set the importance level of an item corresponding to a frequently used phone number to high, and set the importance level of an item corresponding to a not frequently used phone number to low.

Figure 7B:
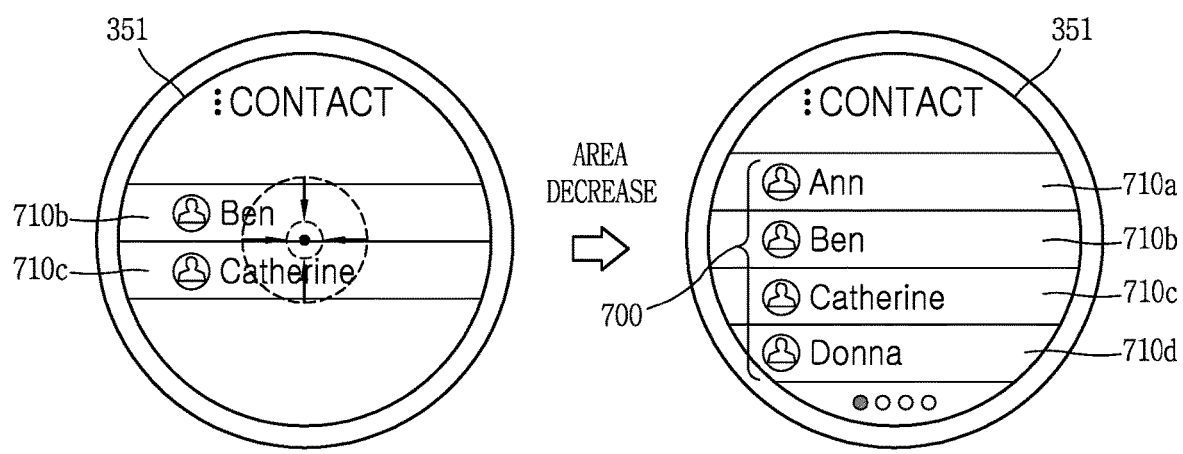

Similarly, as illustrated in FIG. 7B, the controller 180 may display all the items 710a, 710b, 710c, 710d included in the contact list 700 on the display unit 351 in response to a decreasing touch area of the touch input while only the items 710b, 710c having high importance levels are displayed.

Furthermore, when the screen information is composed of a plurality of pages, the controller 180 may move between a plurality of pages based on a change direction of the touch area of the touch input. For example, as illustrated in the first drawing of FIG. 8A, when the contact list is composed of a plurality of pages, an indicator 720 indicating each page may be displayed on the display unit 351. The controller 180 may display an indicator 720a indicating a currently displayed page to be visually distinguished from indicators 720b, 720c, 720d indicating the remaining pages.

Figure 8A:
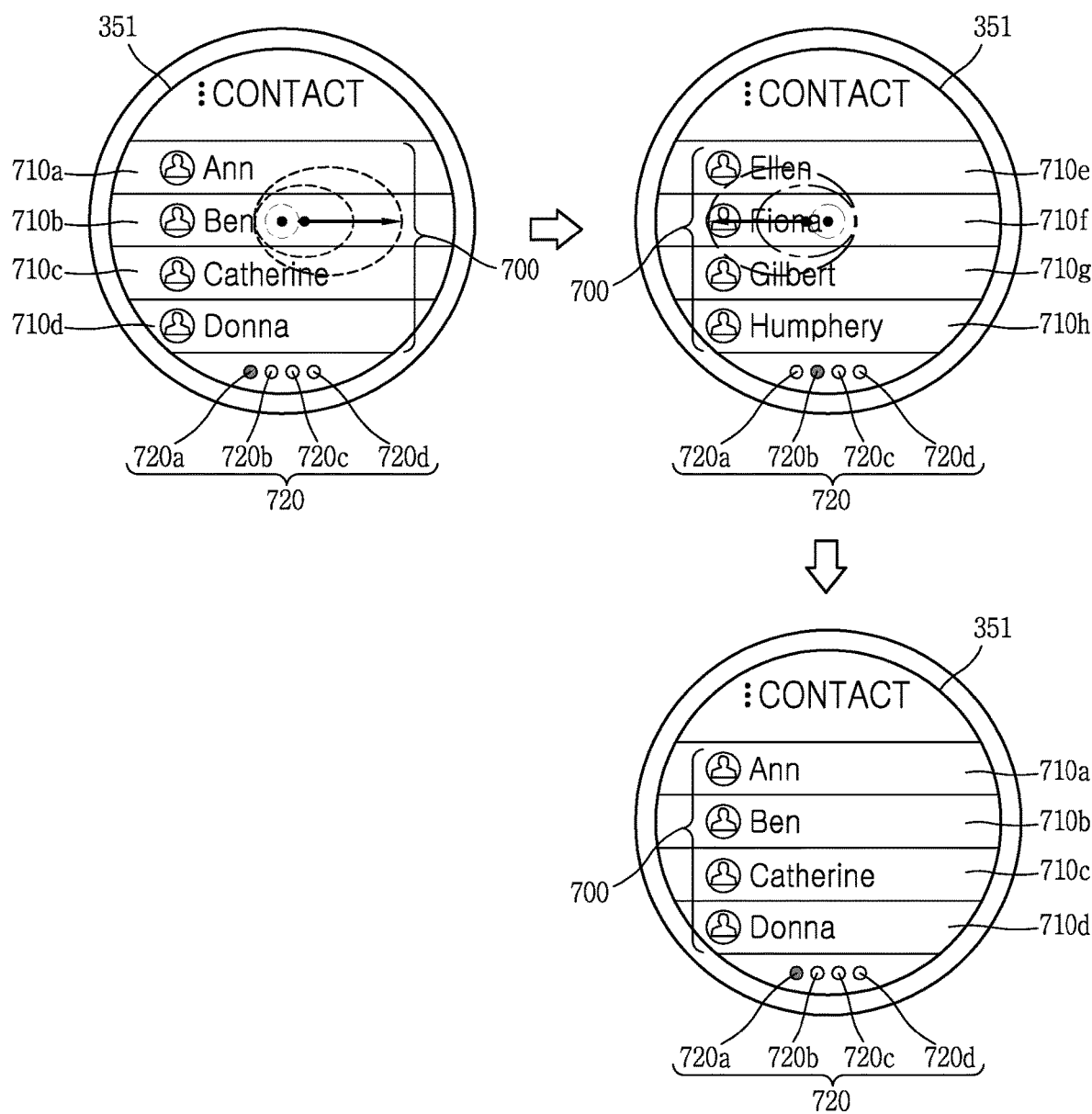

At this time, as illustrated in FIG. 8A, the controller 180 may move a first page to a second page in response to the touch area of the touch input being changed to a first direction while the first page included in the contact list is displayed. In this case, as illustrated in the second drawing of FIG. 8A, the controller 180 may allow a plurality of items 710a, 710b, 710c, 710d included in the first page to disappear on the display unit 351, and display a plurality of items 710e, 710f, 710g, 710h included in the second page.

Similarly, the controller 180 may move the second page to the first page in response to the touch area of the touch input being changed in a second direction opposite to the first direction while the second page is displayed. In this case, as illustrated in FIG. 8A, the controller 180 may display a plurality of items 710a, 710b, 710c, 710d included in the first page on the display unit 351.

The controller 180 may control a display level of the screen information based the touch area of the touch input being changed in a vertical direction. Here, the display level may denote a summary view in which the screen information is simply summarized and displayed, and a detailed view in which all the screen information is displayed. For example, the summary view is a state in which only the title and the identification code are displayed without displaying the specific content of each item included in the list, and the detailed view is a state in which detailed information related to each item included in the list is displayed.

Figure 8B:
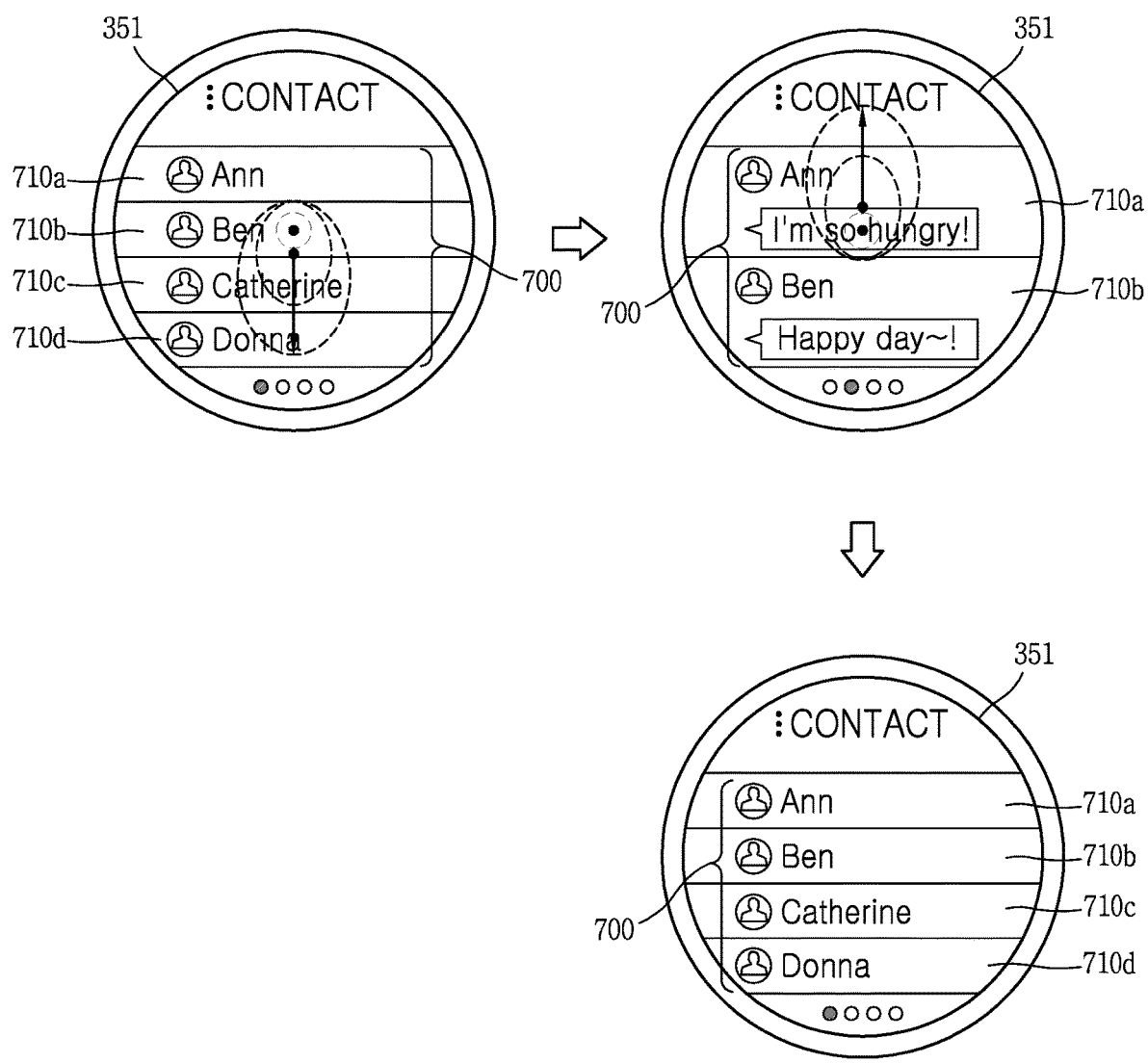

For example, as illustrated in the first drawing of FIG. 8B, the controller 180 may display a plurality of items 710a, 710b, 710c, 710d included in the contact list 700 in a summary view.

At this time, as illustrated in FIG. 8B, the controller 180 may change the summary view to the detailed view, and display the detailed view of each item on the display unit 351 in response to the touch area of the touch input being increased in a direction from top to bottom with respect to a front surface of the display unit 351 in a summary view state.

Similarly, as illustrated in the third drawing of FIG. 8C, the controller 180 may allow the detailed information of each item to disappear, and switch it to a summary view in which only the titles of the plurality of items are displayed in response to the touch area of the touch input being increased in a direction from bottom to top with respect to a front surface of the display unit 351 in a detailed view state.

When screen information capable of being enlarged or reduced instead of a list including a plurality of items is displayed on the display unit 351, the controller 180 may enlarge or reduce screen information according to a change direction of the touch area of the touch input applied to the display unit 351. Here, the screen information capable of being enlarged or reduced may include an image, a video, a document, and the like.

Figure 9A:
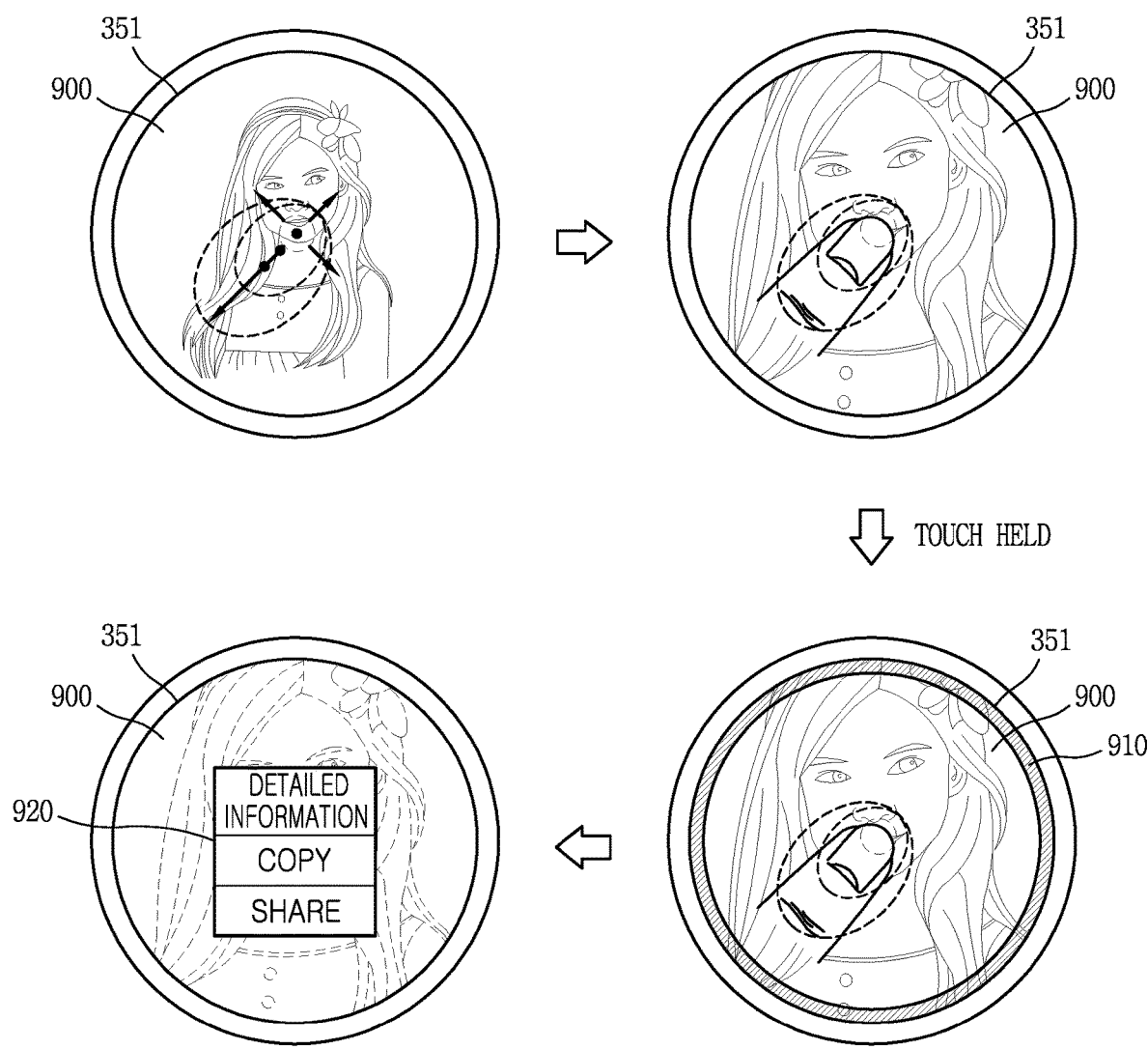

For example, as illustrated in the first drawing in FIG. 9A, an image 900 may be displayed on the display unit 351. At this time, as illustrated in the second drawing of FIG. 9A, the controller 180 may display the image 900 in an enlarged manner in response to an increase in the touch area of the touch input applied on the display unit 351.

At this time, the controller 180 may determine an enlargement degree of the image 900 based on an increasing degree of the touch area. For example, the controller 180 may enlarge the image 900 from a first size to a second size when the touch area increases from the first size to the second size. Furthermore, when the touch area increases from the first size to a third size larger than the second size, the controller 180 may enlarge the image 900 from the first size to a third size larger than the second size.

On the other hand, as illustrated in the third drawing of FIG. 9A, the controller 180 may display an indicator 910 indicating that the image 900 is enlarged to the maximum size in response to the touch input being continuously sensed at a preset size while the image 900 is enlarged to the maximum size.

As illustrated in the fourth drawing of 9A, the controller may display a list 920 indicating functions related to the image 900 in response to the touch input being continuously sensed at a preset size while the indicator 910 is displayed. The functions related to the image 900 may include a function of displaying a photographing time, date, size of an image, an image copy function, an image share function, and the like.

Therefore, the present disclosure may conveniently perform an image related function, together with the enlargement of the image.

In addition, the controller 180 may display the image 900 in a reduced size in response to a decrease in the touch area of the touch input. For example, as illustrated in the first and second drawings of FIG. 9B, the controller 180 may reduce the image 900 in response to a decrease in the touch area of the touch input.

Moreover, similar to the above description, the controller 180 may determine a degree of reduction of the image 900 according to a degree of reduction of the touch area. It will be replaced by the foregoing description.

Figure 9B:
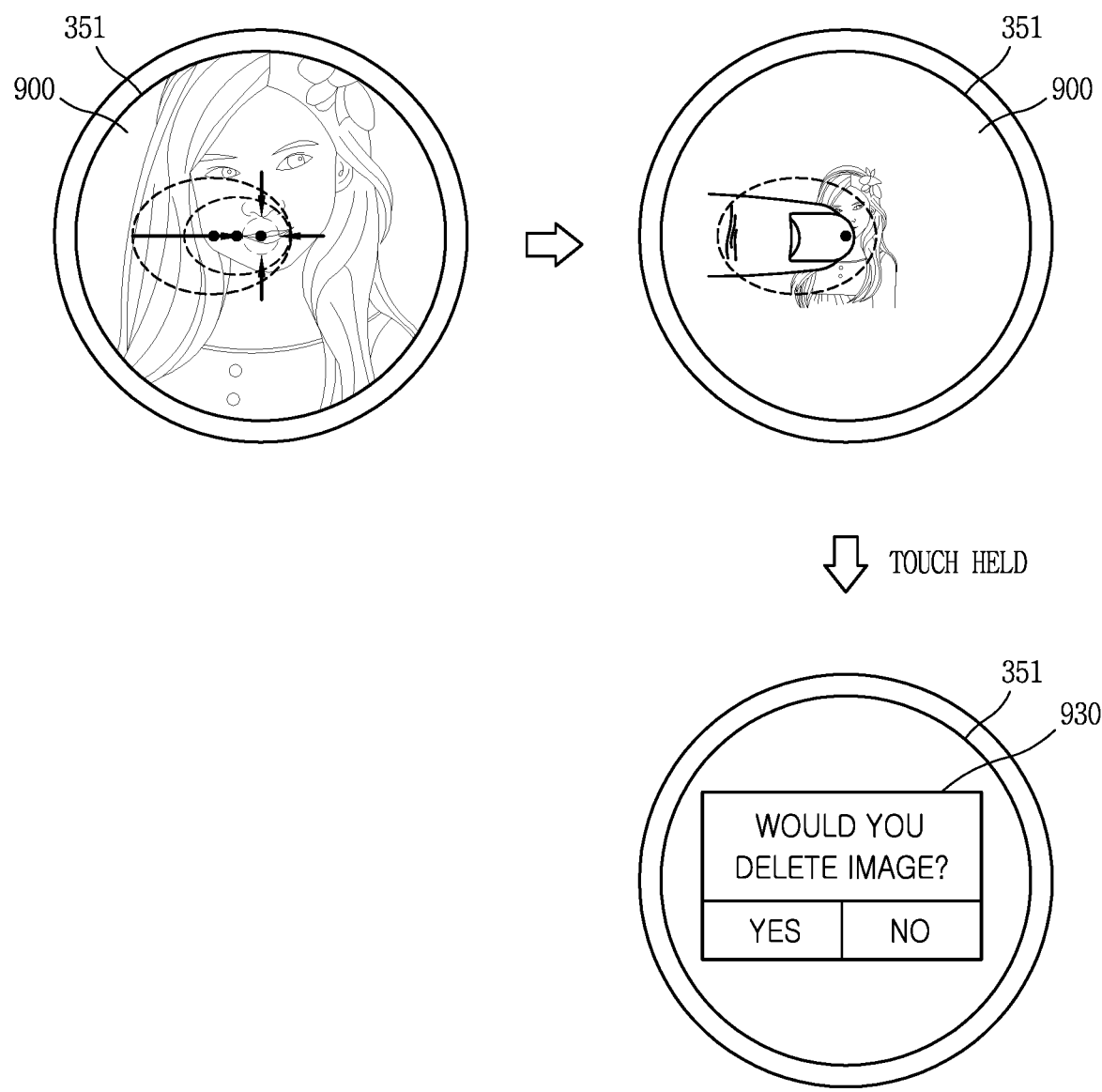

On the other hand, as illustrated in the third drawing of FIG. 9B, when the touch input is maintained at a predetermined size for a predetermined period of time while the image is reduced to the minimum size, the controller 180 may display a graphic object 930 for deleting the image from the memory.

Accordingly, the user may perform various functions by changing the touch attribute of the touch input even when a single touch input is applied.

In the above, a method of controlling the display state of the screen information according to a change of the touch area of the touch input has been described.

Hereinafter, a method of controlling the brightness of a display unit according to a touch attribute of a touch input when a user turns on the display unit through a touch input to a watch-type terminal will be described. FIG. 10 is a conceptual view illustrating a method of controlling the brightness of a display unit according to a touch attribute of a touch input when a user turns on the display unit through a touch input to a watch-type terminal.

The controller 180 may turn on the illumination of the display unit 351 in response to a preset type of touch being applied to the display unit 351 while the illumination of the display unit 351 of the watch-type terminal is turned off. For example, as illustrated on the left side of FIG. 10, the controller 180 may turn on the display unit 351 in response to touches being simultaneously applied to two points.

At this time, the controller 180 may determine the brightness of the display unit 351 based on the touch attribute of the preset type of touch. For example, as illustrated in the first drawing on the right side of FIG. 10, when the touch area of the touch input applied while the illumination of the display unit 351 is turned off is a first area, the controller 180 may turn on the illumination of the display unit 351 at a first brightness. Furthermore, as illustrated in the second drawing on the right side of FIG. 10, when the touch area of the touch input applied while the illumination of the display unit 351 is turned off is a second area larger than the first area, the controller 180 may turn on the illumination of the display unit 351 at a second brightness higher than the first brightness. Furthermore, as illustrated in the third drawing on the right side of FIG. 10, when the touch area of the touch input applied while the illumination of the display unit 351 is turned off is a third area larger than the second area, the controller 180 may turn on the illumination of the display unit 351 at a third brightness higher than the second brightness.

Accordingly, the user may control the brightness of the display unit 351 in the turned-on state while at the same time turning on the display unit 351.

In the above, a method of controlling the brightness of a display unit according to a touch attribute of a touch input when the display unit is turned on through a touch input has been described.

Figure 11A:
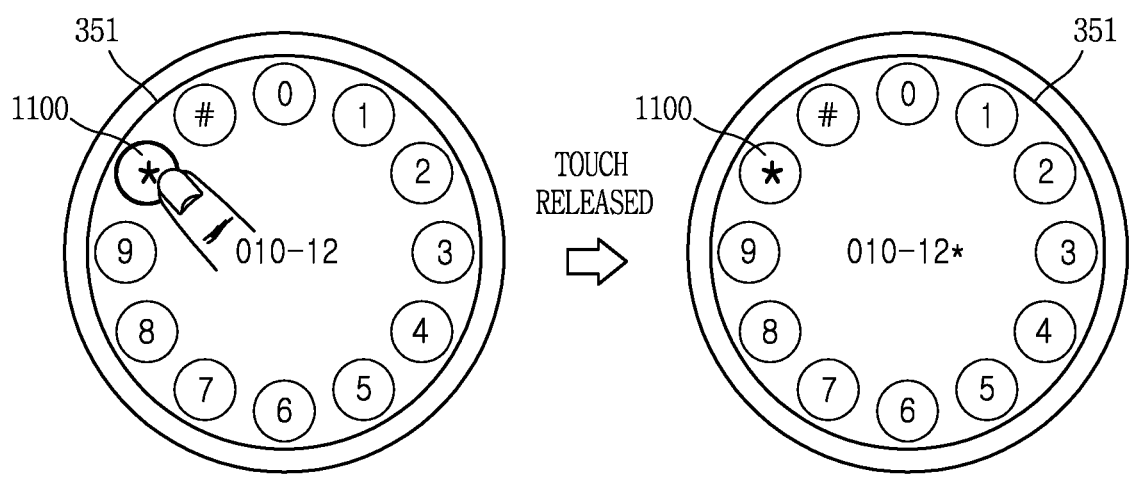
FIGS. 11A through 11C are conceptual views illustrating a method of inputting characters according to a touch attribute of a touch input.
Figure 11B:
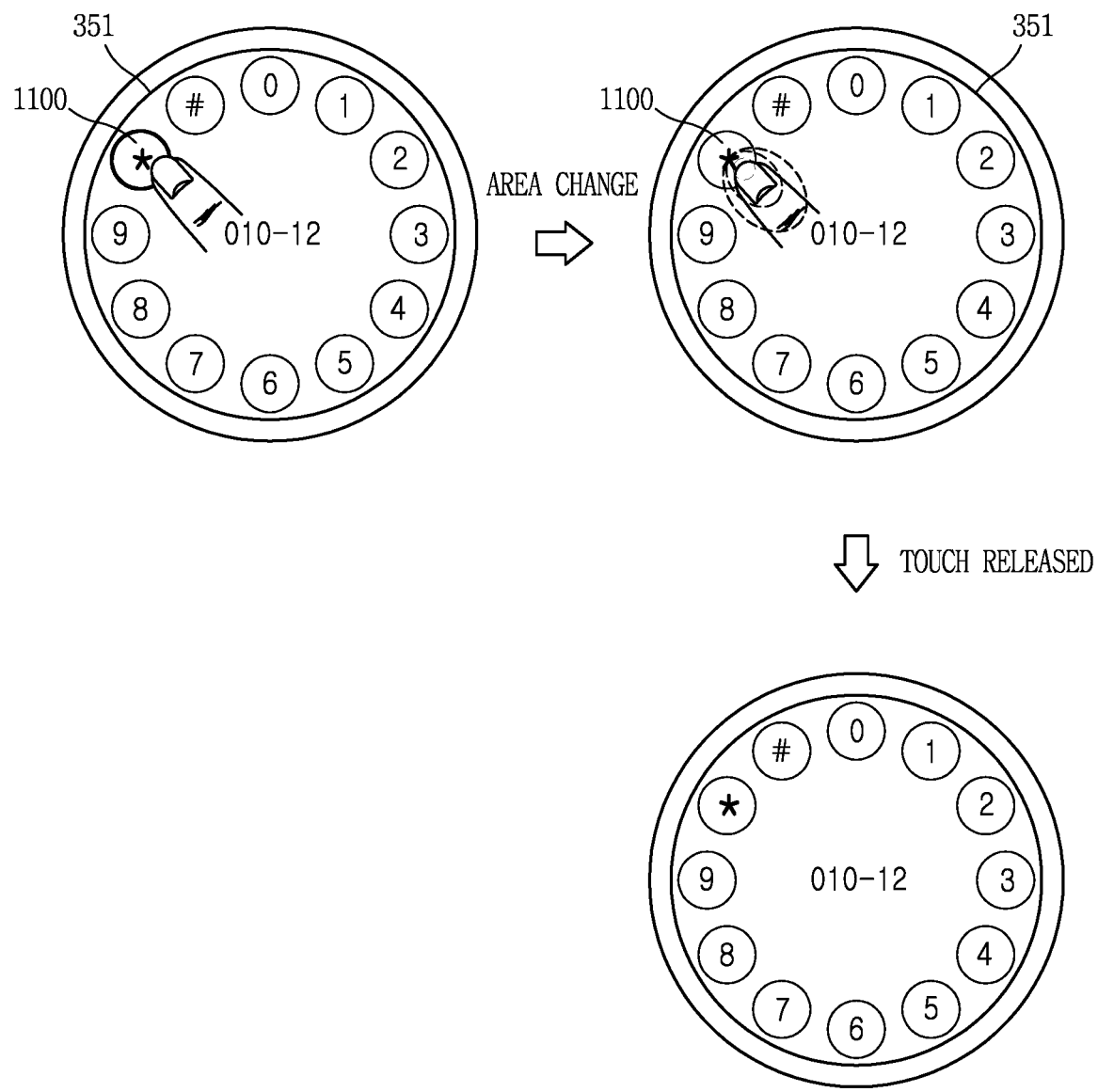
Figure 11C:
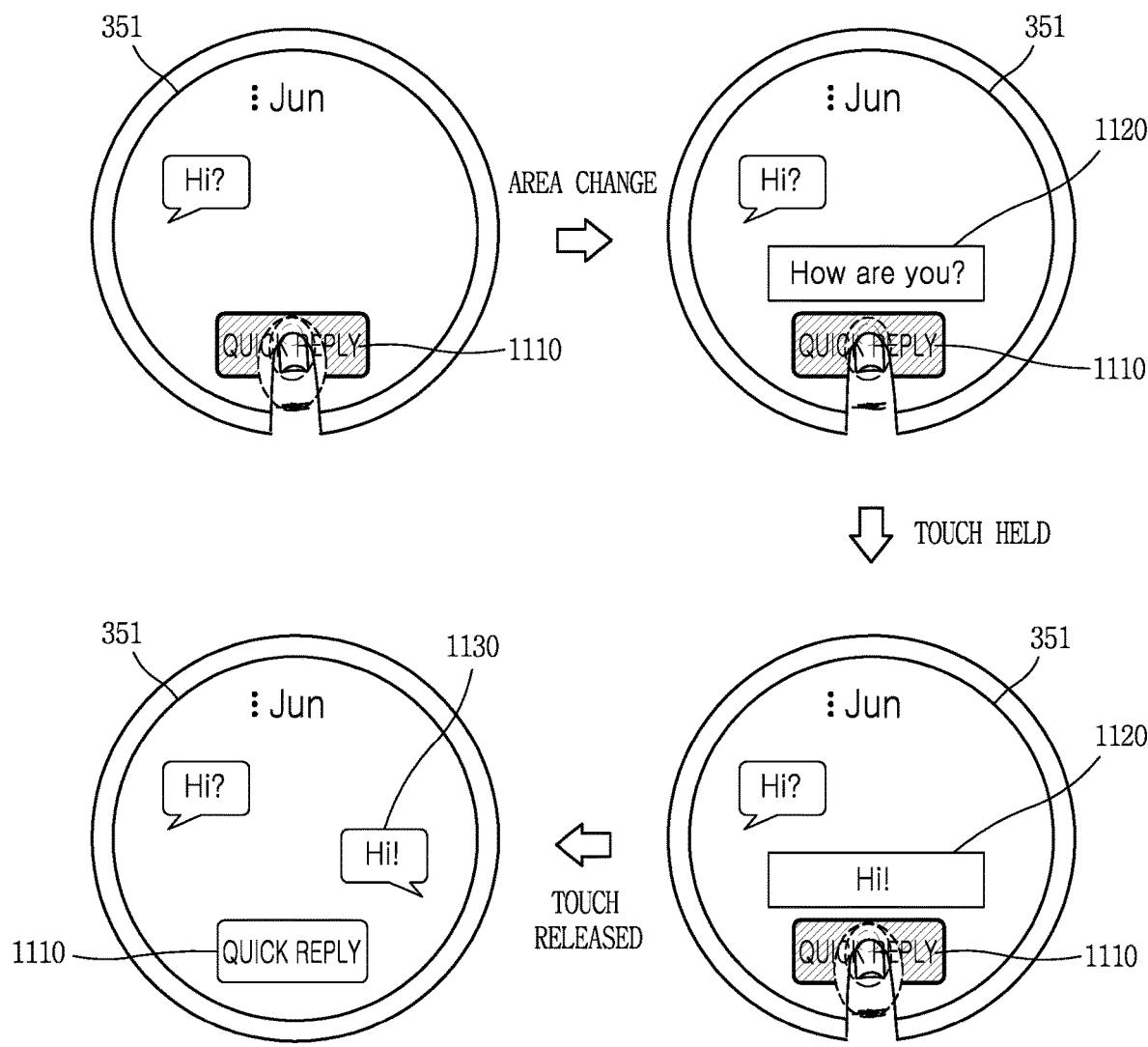

Hereinafter, a method of entering text according to the touch attribute of the touch input will be described. FIGS. 11A through 11C are conceptual views illustrating a method of inputting characters according to a touch attribute of a touch input.

The controller 180 may perform a different function according to the touch attribute of the touch input. In other words, the controller 180 may perform a first function when the touch input is released without sensing a change in the touch area of the touch input, and perform a second function when the touch input is released subsequent to sensing a change in the touch area of the touch input.

For example, as illustrated in FIG. 11A, the controller 180 may sense that a touch input is applied to a region where a graphic object 1100 corresponding to a special character (*) is displayed. At this time, when the touch input is released while the change of the touch area of the touch input is not sensed, the controller 180 may enter the special character (*). In this case, the special character (*) may be displayed on display unit 351.

On the contrary, as illustrated in FIG. 11B, the controller 180 may sense a change in the touch area of the touch input applied to a region where a graphic object 1100 corresponding to a special character (*) is displayed. When the touch input is released subsequent to sensing a change in the touch area, the controller 180 may not perform an input function of the special character (*). In this case, the special character (*) may not be displayed on display unit 351.

Therefore, when the user enters a touch input incorrectly, it may be possible to restrict a function according to the touch input from being executed without an additional control command for canceling the execution.

In addition, when transmitting a message from the watch-type terminal, the controller 180 may search for a recommendation sentence based on a change in the touch attribute of the touch input. For example, as illustrated in the first drawing in FIG. 11C, the control unit 180 may apply a touch input to the graphic object 1110 associated with a message send function.

At this time, as illustrated in the second drawing of FIG. 11C, the controller 180 may display a recommendation sentence 1120 on the display unit 351 when a change in the touch area of the touch input is sensed.

Furthermore, as illustrated in the third drawing of FIG. 11C, the controller 180 may display the recommendation sentence 1120 on the display unit 351 in various ways based on a change in the touch area of the touch input. For example, the recommendation sentence 1120 may be changed from "how are you?" to "hi" based on a change in the touch area of the touch input.

Meanwhile, when the touch input is released while a specific recommendation sentence is displayed, the controller 180 may transmit the specific recommendation sentence to an external terminal. For example, as illustrated in the fourth drawing of FIG. 11C, when the touch input is released while a recommendation sentence "hi" is displayed, "hi" may be transmitted to the other party of the message.

Accordingly, the user may perform both the search of a recommendation sentence and the transmission of a recommendation sentence through a single touch input.

In the above, a method of entering text according to the touch attribute of the touch input has been described.

On the other hand, in the foregoing description, a method of controlling a watch-type terminal according to a touch attribute of a touch input in the watch-type terminal has been described. However, the present disclosure is not limited to a watch-type terminal, but may also be similarly applicable to a mobile terminal such as a smart phone.

Hereinafter, a method of controlling a mobile terminal according to a touch attribute of a touch input in the mobile terminal according to the present disclosure will be described in more detail. Furthermore, the same components of the mobile terminal and the watch-type terminal will be described by the same reference numerals.

Figure 12:
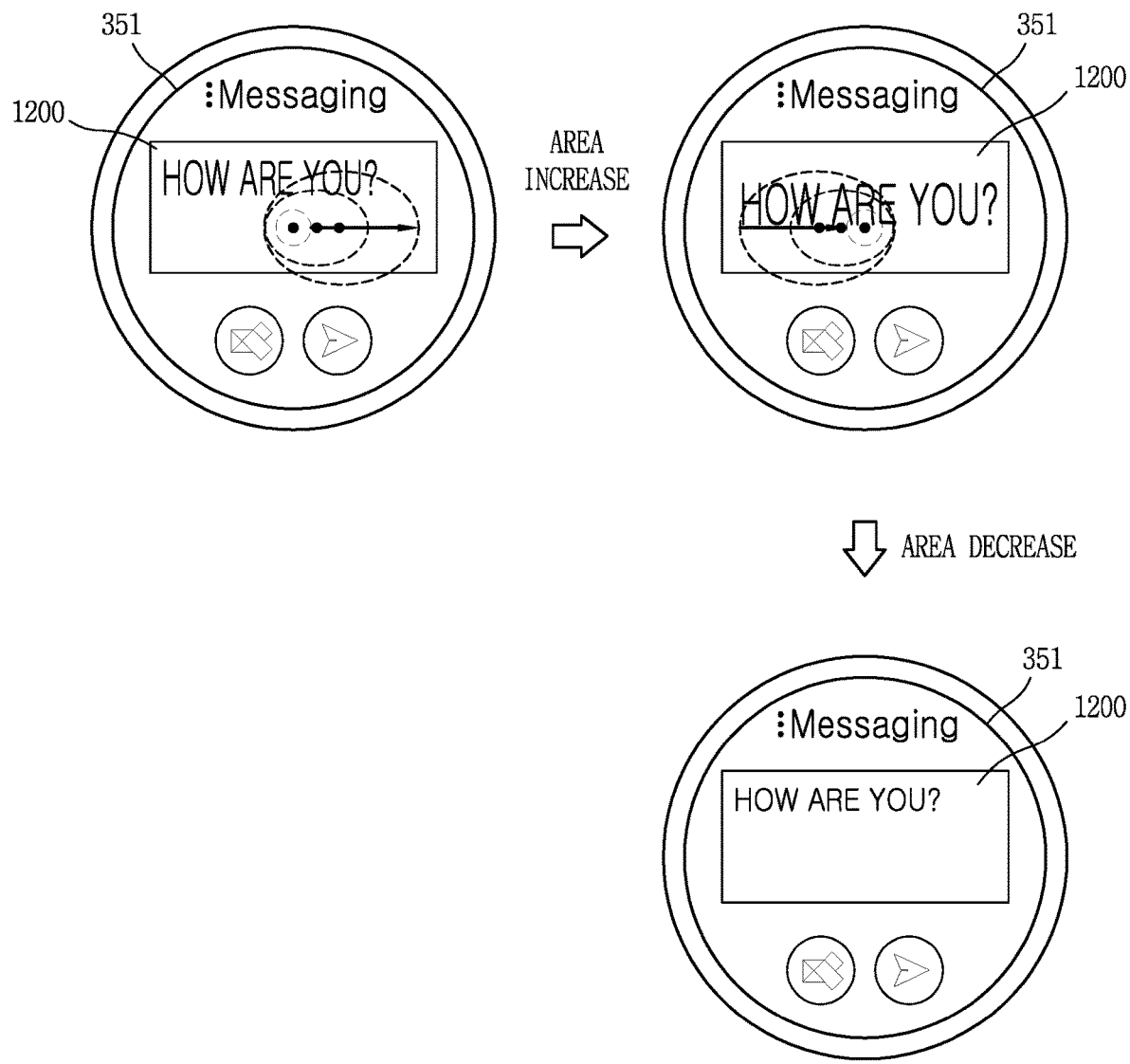
FIGS. 12 and 13 are conceptual views illustrating a method of performing control related to a message application according to a touch attribute of a touch input.
Figure 13:
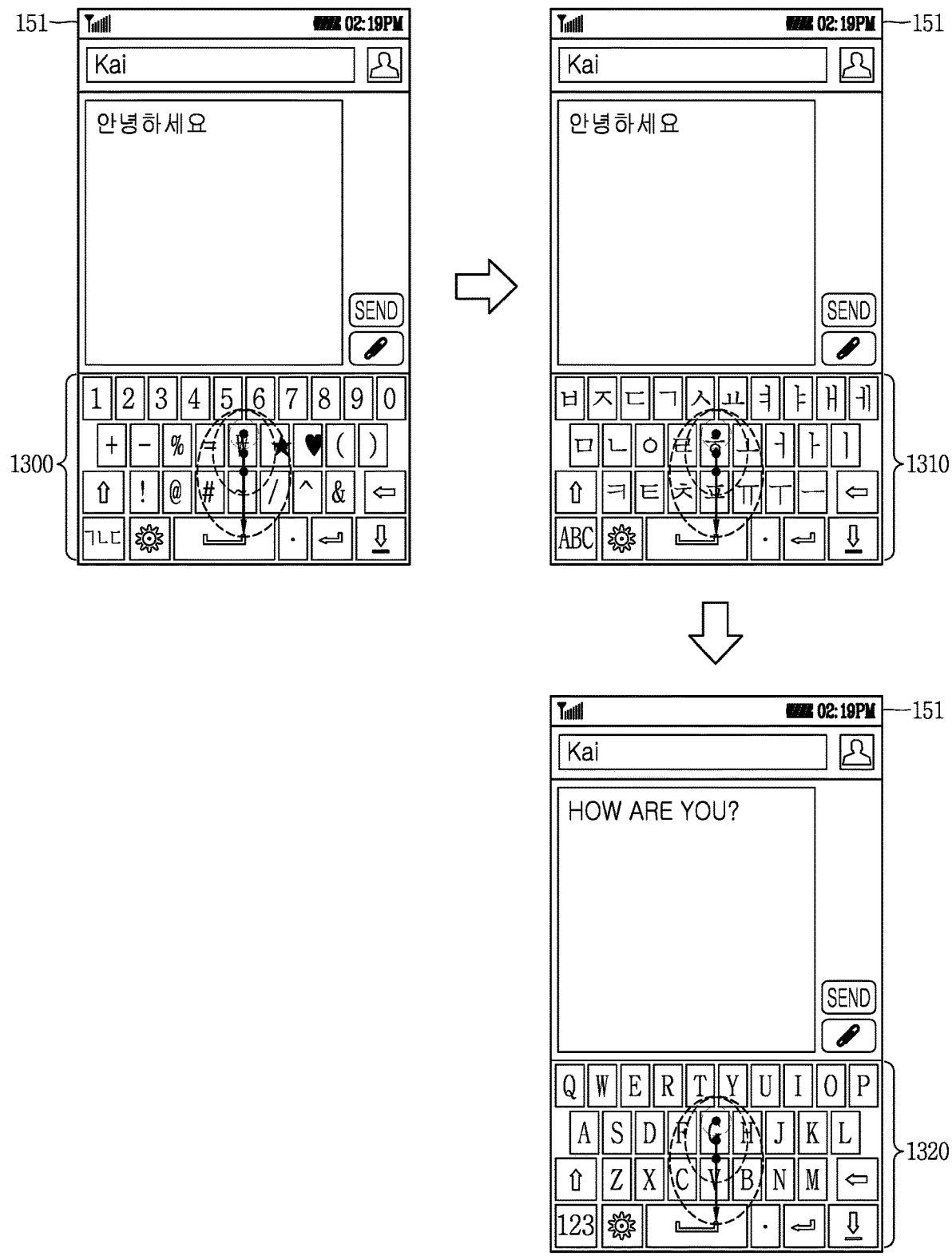

FIGS. 12 and 13 are conceptual views illustrating a method of performing control related to a message application according to a touch attribute of a touch input.

The controller 180 of the mobile terminal according to the present disclosure may display an execution screen of a message application on the display unit 351 when the message application is executed. The message application is an application program that provides a function of transmitting and receiving a message to and from an external terminal through wireless communication. The user may execute a message application by applying a touch to an icon associated with the message application.

An execution screen of the message application may include screen information related to the message application. For example, as illustrated in the first drawing in FIG. 12, the execution screen of the message application may include content 1200 of a message to be transmitted, a graphic object indicating a message send function, a graphic object indicating a message transfer function, and the like.

The controller 180 may change a display size of the content of the message to be transmitted based on a change in the touch area of the touch input applied on the execution screen of the message application.

For example, as illustrated in the second drawing of FIG. 12, the controller 180 may change the content of the message to be transmitted from a first size to a second size larger than the first size based on an increase in the touch area of the touch input applied to the execution screen of the message application.

In addition, as illustrated in the third drawing of FIG. 12, the controller 180 may display the content of the message to be transmitted from a second size to a first size smaller than the second size based on a decrease in the touch area of the touch input applied to the execution screen of the message application.

In other words, the user may adjust the content of the message to be large or small through a change in the area of the touch input. On the other hand, when screen information capable of changing the size is displayed on the display unit, the controller 180 may change the display size of the screen information according to a change in the touch area of the touch input.

Moreover, in addition to the display size, the controller 180 may change the overall display state of the screen information such as display color, display style, font, and the like, through a change in the touch attribute of the touch input. Therefore, the present disclosure may change only the touch attribute of the touch input to change the display state of the display unit, thereby enhancing user convenience.

Furthermore, when a keyboard image for entering a character set is displayed on an execution screen of the message application, the controller 180 may switch it to a keyboard image for entering a different character set according to a change in the touch area of the touch input applied to the keyboard image. A character set refers to a set of related characters such as a Korean set, an English set, and a special character set.

For example, as illustrated in the first and second drawings of FIG. 13, the controller 180 may switch a keyboard image 1300 for entering a first character set to a keyboard image 1310 for entering a second character set in response to a change in the touch area of the touch input in a preset direction.

In addition, as illustrated in the second and third drawings of FIG. 13, the controller 180 may switch a keyboard image 1310 for entering a second character set to a keyboard image 1320 for entering a third character set in response to a change in the touch area of the touch input in a preset direction while the keyboard image 1310 for entering the second character set is displayed.

Accordingly, the user may conveniently perform movement between the keyboard images having different character sets through a change of the touch area.

Figure 14:
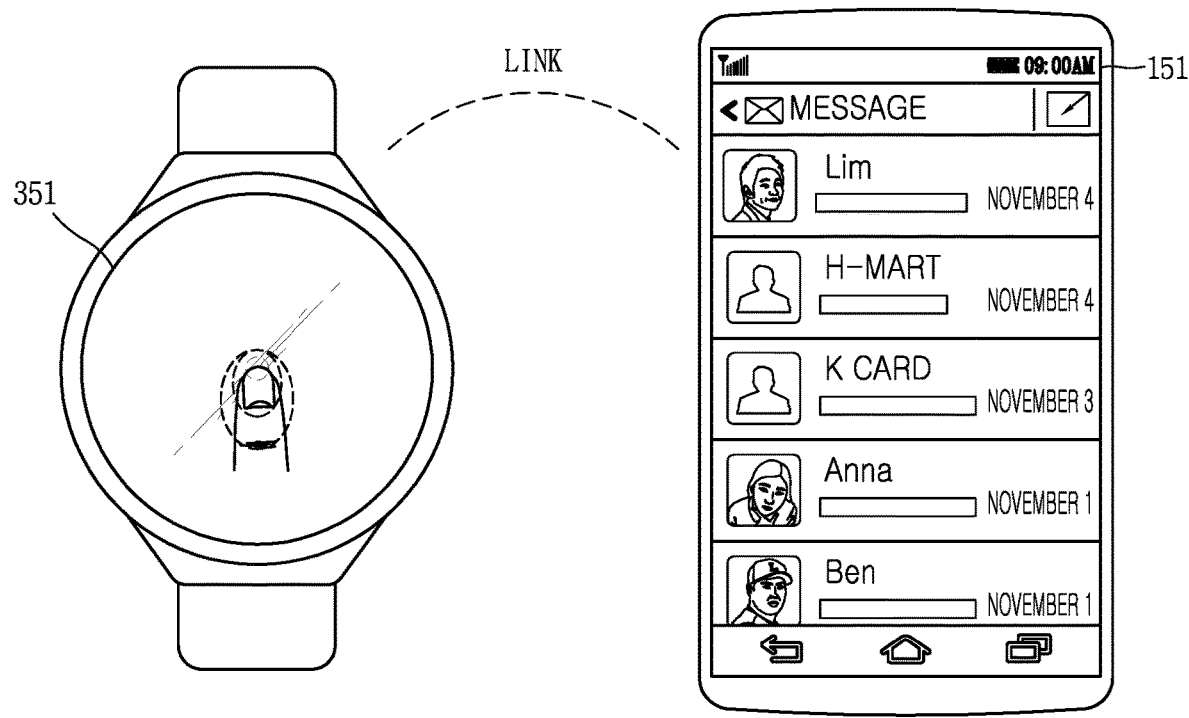
FIG. 14 is a conceptual view illustrating a method of controlling a mobile terminal through a watch-type terminal when the watch-type terminal and the mobile terminal are linked to each other through wireless communication.
Figure 14:
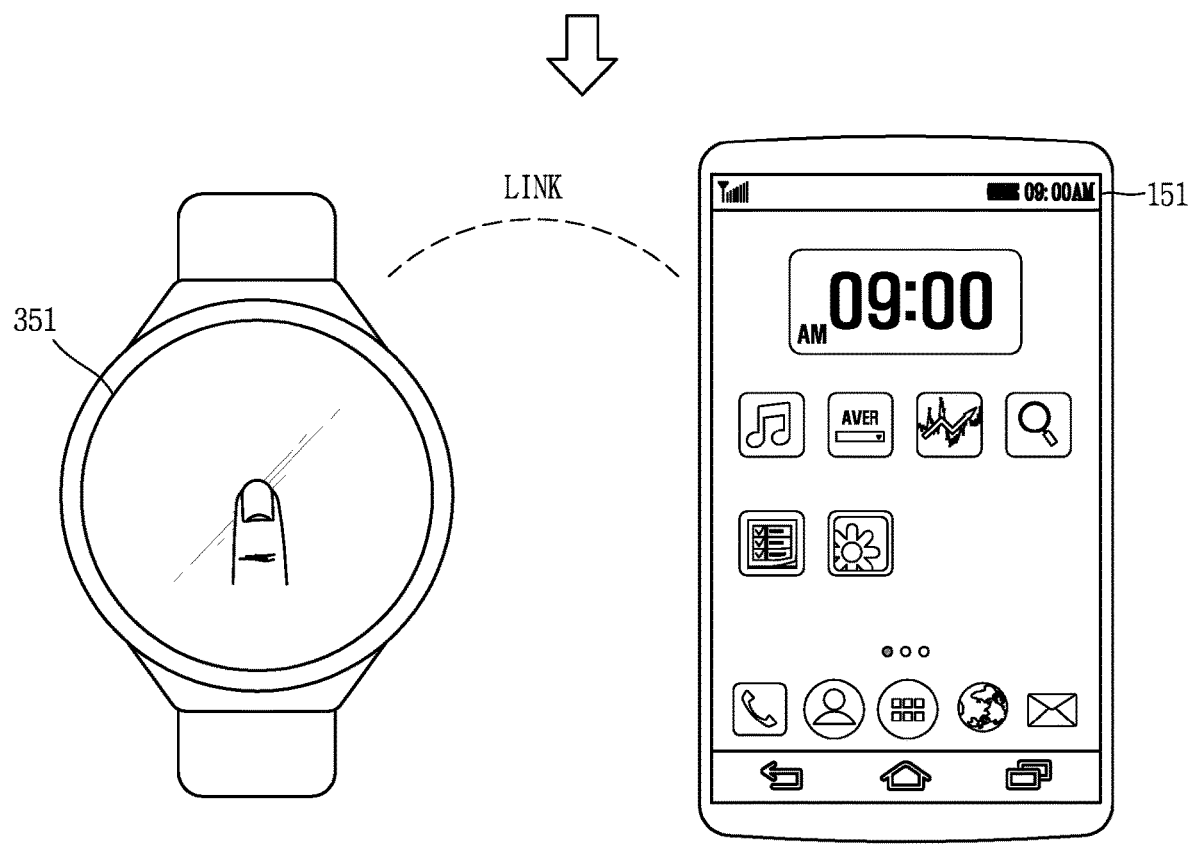

Hereinafter, a method of controlling a mobile terminal through a watch-type terminal when the watch-type terminal and the mobile terminal are linked to each other through wireless communication will be described. FIG. 14 is a conceptual view illustrating a method of controlling a mobile terminal through a watch-type terminal when the watch-type terminal and the mobile terminal are linked to each other through wireless communication.

The mobile terminal and the watch-type terminal according to the present disclosure may transmit and receive data to and from each other through wireless communication. In this case, it may be said that the mobile terminal and the watch-type terminal are linked to each other. The linking may also be referred to as "pairing", "connection," or the like.

The linking between the mobile terminal and the watch-type terminal may be carried out through a short-range communication unit. For example, the mobile terminal and the watch-type terminal may be linked through Bluetooth communication or NFC communication.

When the mobile terminal and the watch-type terminal are linked to each other, the controller of the mobile terminal may receive specific information from the watch-type terminal or transmit specific information to the watch-type terminal. Similarly, the controller of the watch-type terminal may receive specific information from the mobile terminal or transmit specific information to the mobile terminal. Through this, the mobile terminal and the watch-type terminal may acquire the same information as each other. The operation of the mobile terminal and the watch-type terminal operating to have the same information as each other may be referred to as "synchronization."

On the other hand, when the mobile terminal is linked to the watch-type terminal, the controller 180 of the watch-type terminal may control the operation of the mobile terminal according to a touch attribute of the user's touch input applied while the display unit 351 of the watch-type terminal is turned off. The present disclosure is not limited thereto, and the controller 180 of the watch-type terminal may control the operation of the mobile terminal according to the touch attribute of the user's touch input applied while the display unit 351 is turned on.

For example, as illustrated in FIG. 14, the controller 180 of the watch-type terminal may transmit a control command for executing a home function that enters a home screen page on the mobile terminal based on sensing that a touch area of a touch input applied while the display unit 351 of the watch-type terminal is turned off is being changed in a specific direction. In this case, the mobile terminal may display a home screen page on the display unit 151 based on the control command for executing the home function.

In addition, the same operation of the mobile terminal as that of the watch-type terminal described above may be controlled through a touch input of the watch-type terminal.

Through this, the user may use the display unit 351 of the watch-type terminal as an external input device of the mobile terminal.

Moreover, although not shown, in the present disclosure, when the mobile terminal and the watch-type terminal are linked to each other, the operation of the watch-type terminal may be controlled based on a control command according to the touch attribute of the user's touch input.

Moreover, although not shown, in the present disclosure, the operation of the mobile terminal may be controlled based on a control command according to the touch attribute of the user's touch input applied to the mobile terminal while the mobile terminal and the watch-type terminal are not linked to each other.

The present disclosure may execute a specific function associated with a change direction of a touch attribute of the touch input using a touch attribute change of the touch input. Accordingly, the present disclosure may control the operation of the watch-type terminal using a change in a touch attribute of the touch input, without displaying visual information, in the watch-type terminal with a small display unit having a limited display amount.

In addition, the present disclosure may control the display of visual information displayed on the display unit using an area change of the touch input. As a result, the present disclosure may change a display state of visual information without multiple times of touch inputs, even with only one touch input.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:
1. A terminal, comprising:
a display unit;
a sensing unit configured to sense a touch attribute of a touch input applied to the display unit; and
a controller configured to control a watch-type terminal to operate in either one of a first mode for controlling the operation of the watch-type terminal according to a change direction of a touch area of the touch input and a second mode for controlling screen information displayed on the display unit according to the change direction of the touch area of the touch input,
wherein the controller executes a specific function according to the either one of the modes based on a change direction of the touch attribute of the touch input in the either one of the modes, and the touch attribute is any one of a touch area, a touch pressure and a combination of the touch area and the touch pressure, and wherein the controller is further configured to execute the specific function again or execute an additional function in response to the touch attribute having a preset size subsequent to the execution of the specific function and being continuously sensed for a preset period of time.

2. The terminal of claim 1, wherein an increasing direction of the touch attribute is a movement direction of the center point of the touch attribute of the touch input.

3. The terminal of claim 1, wherein while the terminal operates in the first mode, the controller executes a function that was executed prior to executing a function currently being executed in the watch-type terminal when the change direction of the touch attribute is a first direction, displays a home screen page on the display unit when the change direction of the touch attribute is a second direction, and displays a setting menu related to the function currently being executed in the watch-type terminal when the change direction of the touch attribute is a third direction.

4. The terminal of claim 1, wherein while the terminal operates in the first mode, the controller executes a function that was executed prior to executing a function currently being executed in the watch-type terminal when the change direction of the touch attribute is a first direction, displays a home screen page on the display unit when the change direction of the touch attribute is a second direction, and displays recently executed applications when the change direction of the touch attribute is a third direction.

5. The terminal of claim 1, wherein when the touch input is released, the controller no longer executes the specific function or the additional function.

6. The terminal of claim 1, wherein a list including a plurality of items is displayed on the display unit, and when the touch input is sensed while the watch type terminal operates in the second mode, the controller selects a specific item among the plurality of items according to the change direction of the touch attribute of the touch input.

7. The terminal of claim 6, wherein the controller displays screen information corresponding to a specific item selected at the time of release of the touch input among the plurality of items on the display unit in response to the touch input being released.

8. The terminal of claim 1, wherein screen information is displayed on the display unit, and the controller controls a display level of the screen information in response to a change in the touch attribute of the touch input applied to the display unit while the watch-type terminal operates in the second mode.

9. The terminal of claim 8, wherein the controller displays only part of the screen information having a high importance level in response to an increase of the touch attribute of the touch input, and displays the detailed information of the screen information in response to a decrease of the touch attribute of the touch input.

10. The terminal of claim 1, wherein on the display unit, the controller enlarges or reduces screen information displayed on the display unit according to a degree of change of the touch attribute of the touch input when the watch-type terminal operates in the second mode.

11. The terminal of claim 10, wherein the controller enlarges the screen information according to a degree of increase of the touch attribute of the touch input, and reduces the screen information according to a degree of reduction of the touch attribute of the touch input while the screen information is displayed on the display unit.

12. The terminal of claim 1, wherein when a preset type of touch input is applied while the illumination of the display unit is turned off, the controller controls the display unit to turn on the display unit at a brightness corresponding to the touch attribute of the preset type of touch input.

13. The terminal of claim 1, wherein a keyboard image including keys corresponding to a plurality of characters is displayed on the display unit, and when the touch input is released while the touch attribute of the touch input is not changed in a state where the watch-type terminal operates in the second mode, the controller enters a character corresponding to a key displayed on a region to which the touch is applied in response to the touch input being released.

14. The terminal of claim 13, wherein when the touch input is released subsequent to changing the touch attribute of the touch input, the controller restricts an input of a character corresponding to a key displayed on a region to which the touch input is applied in response to the touch input being released.

15. The terminal of claim 1, wherein the controller displays different screen information on the display unit according to a degree of change of the touch attribute of the touch input, and selects screen information displayed on the display unit at the time of the release of the touch input when the touch input is released.

16. The terminal of claim 1, wherein while screen information is displayed in a first size on the display unit, the controller displays the screen information in a second size larger than the first size when the touch attribute of the touch input increases, and displays the screen information in a third size smaller than the first size when the touch attribute of the touch input decreases.

17. A method of controlling a terminal, the method comprising:

operating in either one of a first mode for controlling the operation of a watch-type terminal according to a change direction of a touch attribute of a touch input and a second mode for controlling screen information displayed on a display unit according to a change direction of a touch attribute of a touch input;

sensing a touch attribute of a touch input applied to the display unit;

detecting a change direction of the touch attribute of the touch input;

executing a specific function according to either one of the modes in response to a change of the touch attribute; and executing the specific function again or executing an additional function in response to the touch attribute having a preset size subsequent to the execution of the specific function and being continuously sensed for a preset period of time, wherein the touch attribute is any one of a touch area, a touch pressure and a combination of the touch area and the touch pressure.

18. The method of claim 17, wherein when the watch-type terminal operates in the first mode, the specific function is any one of a cancel function for canceling the execution of a function currently being executed, a home function for displaying a home screen page, a recent executed app function for displaying recently executed applications, and a menu function for displaying a setting menu.

19. The method of claim 17, wherein said detecting the change direction of the touch attribute comprises:

calculating the center point of the touch attribute prior to changing the touch attribute;
sensing a change of the touch attribute;
calculating the center point of the changed touch attribute subsequent to changing the touch attribute; and
calculating a movement direction of the center point of the touch attribute prior to the change and the center point of the touch attribute subsequent to the change as a change direction of the touch attribute.

* * * * *